US012767767B2

(12) United States Patent
Aksoy et al.

(10) Patent No.: US 12,767,767 B2
(45) Date of Patent: Oct. 20, 2026

(54) METHOD TO MAKE HYDROGELS AND CELLULOSE FROM PECTIN- AND PROTEIN-CONTAINING CELLULOSIC BIOMASS

(71) Applicant: AUBURN UNIVERSITY, Auburn, AL (US)

(72) Inventors: Burak Aksoy, Auburn, AL (US); Zhihua Jiang, Auburn, AL (US); Navid E. Alamdari, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 479 days.

(21) Appl. No.: 18/508,979

(22) Filed: Nov. 14, 2023

(65) Prior Publication Data

US 2024/0158584 A1 May 16, 2024

Related U.S. Application Data

(60) Provisional application No. 63/425,074, filed on Nov. 14, 2022.

(51) Int. Cl.
*C08J 3/075* (2006.01)

(52) U.S. Cl.
CPC ........... *C08J 3/075* (2013.01); *C08J 2305/06* (2013.01); *C08J 2389/00* (2013.01)

(58) Field of Classification Search
CPC ..... C08J 3/075; C08J 2305/06; C08J 2389/00
See application file for complete search history.

(56) References Cited

U.S. PATENT DOCUMENTS 5,929,051 A * 7/1999 Ni ........................ C08B 37/0003 536/2
2004/0200386 A1* 10/2004 Damodaran ............ A61L 15/60 106/140.3
2023/0331932 A1* 10/2023 Rodriguez Garcia ..... C08J 5/18
2026/0055553 A1* 2/2026 Aksoy ......................... C08J 5/18

OTHER PUBLICATIONS

S. Soltani, A. Madadlou, Two-step sequential cross-linking of sugar beet pectin for transforming zein nanoparticle-based Pickering emulsions to emulgels, Carbohydr. Polym. 136 (2016) 738-743.
M. Tang, Y. Zhu, D. Li, B. Adhikari, L. Wang, Rheological, thermal and microstructural properties of casein/K-carrageenan mixed systems, Lwt. 113 (2019) 108296.
J. Tavakoli, Y. Tang, Hydrogel based sensors for biomedical applications: An updated review, Polymers (Basel). 9 (2017) 364.
M.H. Tunick, Small-strain dynamic rheology of food protein networks, J. Agric. Food Chem. 59 (2011) 1481-1486.
F. Ullah, M.B.H. Othman, F. Javed, Z. Ahmad, H.M. Akil, Classification, processing and application of hydrogels: A review, Mater. Sci. Eng. C. 57 (2015) 414-433.
(Continued)

*Primary Examiner* — Andrew J. Oyer
(74) *Attorney, Agent, or Firm* — Joseph T. Leone; Yanjun Ma; De Witt LLP

(57) ABSTRACT

A method of making a hydrogel by treating a cellulosic biomass containing pectin and protein with an aqueous acidic solution at a pH, at a temperature, and for a time sufficient to cause formation of at least a gel fraction containing the hydrogel.

22 Claims, 8 Drawing Sheets

(56) References Cited

OTHER PUBLICATIONS

D. Vlassopoulos, M. Cloitre, Tunable rheology of dense soft deformable colloids, Curr. Opin. Colloid Interface Sci. 19 (2014) 561-574.
Y. Wang, Y. Shen, G. Qi, Y. Li, X.S. Sun, D. Qiu, Y. Li, Formation and physicochemical properties of amyloid fibrils from soy protein, Int. J. Biol. Macromol. 149 (2020) 609-616.
O. Wichterle, D. Lim, Hydrophilic gels for biological use, Nature. 185 (1960) 117-118.
W. Wijaya, A.R. Patel, A.D. Setiowati, P. Van der Meeren, Functional colloids from proteins and polysaccharides for food applications, Trends Food Sci. Technol. 68 (2017) 56-69.
W. Wynant, M. Abrahamowicz, Flexible estimation of survival curves conditional on non-linear and time-dependent predictor effects, Stat. Med. 35 (2016) 553-565.
J. Yan, L. Yin, Y. Qu, W. Yan, M. Zhang, J. Su, X. Jia, Effect of calcium ions concentration on the properties and microstructures of doubly induced sorghum arabinoxylan/soy protein isolate mixed gels, Food Hydrocoll. 133 (2022) 107997.
X. Yan, Y. Jia, H. Man, L. Liu, S. Sun, B. Qi, Y. Li, Intermolecular interactions and gel properties of composite agglomerative networks based on oppositely charged polymers: Effects of pH and ionic strength, Food Hydrocoll. 139 (2023) 108557.
X. Yang, A. Li, D. Li, Y. Guo, L. Sun, Applications of mixed polysaccharide-protein systems in fabricating multi-structures of binary food gels—A review, Trends Food Sci. Technol. 109 (2021) 197-210.
J. Yang, M. Shen, T. Wu, Y. Luo, M. Li, H. Wen, J. Xie, Role of salt ions and molecular weights on the formation of Mesona chinensis polysaccharide-chitosan polyelectrolyte complex hydrogel, Food Chem. 333 (2020) 127493.
F. Zha, J. Rao, B. Chen, Plant-based food hydrogels: Constitutive characteristics, formation, and modulation, Curr. Opin. Colloid Interface Sci. 56 (2021) 101505.
D. Zhang, D. Chen, B. Patel, O.H. Campanella, Pectin as a natural agent for reinforcement of pea protein gel, Carbohydr. Polym. 298 (2022) 120038.
T. Zhang, S. Chen, X. Xu, X. Zhuang, Y. Chen, Y. Xue, C. Xue, N. Jiang, Effects of konjac glucomannan on physical properties and microstructure of fish myofibrillar protein gel: Phase behaviours involved, Food Hydrocoll. 134 (2023) 108034.
L. Zheng, J.M. Regenstein, L. Zhou, Z. Wang, Soy protein isolates: A review of their composition, aggregation, and gelation, Compr. Rev. Food Sci. Food Saf. 21 (2022) 1940-1957.
T. Zhu, J. Mao, Y. Cheng, H. Liu, L. Lv, M. Ge, S. Li, J. Huang, Z. Chen, H. Li, Recent progress of polysaccharide-based hydrogel interfaces for wound healing and tissue engineering, Adv. Mater. Interfaces. 6 (2019) 1900761.
E.M. Ahmed, Hydrogel: Preparation, characterization, and applications: A review, J. Adv. Res. 6 (2015) 105-121.
A. Archut, C. Rolin, S. Drusch, H. Kastner, Interaction of sugar beet pectin and pea protein: Impact of neutral sugar side chains and acetyl groups, Food Hydrocoll. (2023) 108454.
E.G. Ates, E.B. Ozvural, M.H. Oztop, Understanding the role of d-Allulose and soy protein addition in pectin gels, J. Appl. Polym. Sci. 138 (2021) 49885.
G.A. Bittencourt, L.P. de Souza Vandenberghe, K. Valladares-Diestra, L.W. Herrmann, A.F.M. de Mello, Z.S. Vásquez, S.G. Karp, C.R. Soccol, Soybean hulls as carbohydrate feedstock for medium to high-value biomolecule production in biorefineries: A review, Bioresour. Technol. 339 (2021) 125594.
F. Capel, T. Nicolai, D. Durand, P. Boulenguer, V. Langendorff, Calcium and acid induced gelation of (amidated) low methoxyl pectin, Food Hydrocoll. 20 (2006) 901-907.
S.Y. Chan, W.S. Choo, D.J. Young, X.J. Loh, Pectin as a rheology modifier: Origin, structure, commercial production and rheology, Carbohydr. Polym. 161 (2017) 118-139.
C. Chatterjee, S. Gleddie, C.-W. Xiao, Soybean bioactive peptides and their functional properties, Nutrients. 10 (2018) 1211.
H. Chen, J. Gan, A. Ji, S. Song, L. Yin, Development of double network gels based on soy protein isolate and sugar beet pectin induced by thermal treatment and laccase catalysis, Food Chem. 292 (2019) 188-196.
H.F. Darge, A.T. Andrgie, H.-C. Tsai, J.-Y. Lai, Polysaccharide and polypeptide based injectable thermo-sensitive hydrogels for local biomedical applications, Int. J. Biol. Macromol. 133 (2019) 545-563.
S.R. Derkach, Y.A. Kuchina, D.S. Kolotova, N.G. Voron'ko, Polyelectrolyte polysaccharide-gelatin complexes: Rheology and structure, Polymers (Basel). 12 (2020) 266.
M. Dominiak, K.M. Søndergaard, J. Wichmann, S. Vidal-Melgosa, W.G.T. Willats, A.S. Meyer, J.D. Mikkelsen, Application of enzymes for efficient extraction, modification, and development of functional properties of lime pectin, Food Hydrocoll. 40 (2014) 273-282.
L. Donato, C. Garnier, B. Novales, J.-L. Doublier, Gelation of globular protein in presence of low methoxyl pectin: effect of Na+ and/or Ca2+ ions on rheology and microstructure of the systems, Food Hydrocoll. 19 (2005) 549-556.
P. Dorishetty, R. Balu, A. Sreekumar, L. de Campo, J.P. Mata, N.R. Choudhury, N.K. Dutta, Robust and tunable hybrid hydrogels from photo-cross-linked soy protein isolate and regenerated silk fibroin, ACS Sustain. Chem. Eng. 7 (2019) 9257-9271.
F.G. Downs, D.J. Lunn, M.J. Booth, J.B. Sauer, W.J. Ramsay, R.G. Klemperer, C.J. Hawker, H. Bayley, Multi-responsive hydrogel structures from patterned droplet networks, Nat. Chem. 12 (2020) 363-371.
U. Einhorn-Stoll, Pectin-water interactions in foods—From powder to gel, Food Hydrocoll. 78 (2018) 109-119.
A. Fernandez-Nieves, H. Wyss, J. Mattsson, D.A. Weitz, Microgel suspensions: fundamentals and applications, John Wiley & Sons, 2011.
H. Fu, J. Li, X. Yang, M.S. Swallah, H. Gong, L. Ji, X. Meng, B. Lyu, H. Yu, The heated-induced gelation of soy protein isolate at subunit level: Exploring the impacts of α and α' subunits on SPI gelation based on natural hybrid breeding varieties, Food Hydrocoll. 134 (2023) 108008.
A. Gawkowska, D., Cybulska, J., Zdunek, Structure-Related Gelling of Pectins and Linking with Other Natural Compounds: A Review, Polymers (Basel). 10 (2018) 762.
P.M. Gilsenan, R.K. Richardson, E.R. Morris, Thermally reversible acid-induced gelation of low-methoxy pectin, Carbohydr. Polym. 41 (2000) 339-349.
F. Gutohrlein, S. Drusch, S. Schalow, Extraction of low methoxylated pectin from pea hulls via RSM, Food Hydrocoll. 102 (2020) 105609.
J.A. Hernandez, B. Soni, M.C. Iglesias, I.B. Vega Erramuspe, C.E. Frazier, M.S. Peresin, Soybean hull pectin and nanocellulose: tack properties in aqueous pMDI dispersions, J. Mater. Sci. 57 (2022) 5022-5035.
K. Hyun, M. Wilhelm, C.O. Klein, K.S. Cho, J.G. Nam, K.H. Ahn, S.J. Lee, R.H. Ewoldt, G.H. McKinley, A review of nonlinear oscillatory shear tests: Analysis and application of large amplitude oscillatory shear (LAOS), Prog. Polym. Sci. 36 (2011) 1697-1753.
S. Ikeda, K. Nishinari, Structural changes during heat-induced gelation of globular protein dispersions, Biopolym. Orig. Res. Biomol. 59 (2001) 87-102.
S. Ikeda, V.J. Morris, Fine-stranded and particulate aggregates of heat-denatured whey proteins visualized by atomic force microscopy, Biomacromolecules. 3 (2002) 382-389.
W. Jiang, J. Qi, J. Liao, X. Yang, Acid/ethanol induced pectin gelling and its application in emulsion gel, Food Hydrocoll. 118 (2021) 106774.
K. Kadiya, S. Ghosh, Pectin degree of esterification influences rheology and digestibility of whey protein isolate-pectin stabilized bilayer oil-in-water nanoemulsions, Food Hydrocoll. 131 (2022) 107789.
H. Kamal, C.F. Le, A.M. Salter, A. Ali, Extraction of protein from food waste: An overview of current status and opportunities, Compr. Rev. Food Sci. Food Saf. 20 (2021) 2455-2475.
A.H. Karoyo, L.D. Wilson, A review on the design and hydration properties of natural polymer-based hydrogels, Materials (Basel). 14 (2021) 1095.

(56) References Cited

OTHER PUBLICATIONS

P.K. Kintner, III, J.P. Van Buren, Carbohydrate interference and its correction in pectin analysis using the m-hydroxydiphenyl method, J. Food Sci. 47 (1982) 756-759.
M. Klein, E. Poverenov, Natural biopolymer-based hydrogels for use in food and agriculture, J. Sci. Food Agric. 100 (2020) 2337-2347.
N. Koumakis, G. Petekidis, Two step yielding in attractive colloids: transition from gels to attractive glasses, Soft Matter. 7 (2011) 2456-2470.
M. Kumar, M. Tomar, V. Saurabh, M. Sasi, S. Punia, J. Potkule, C. Maheshwari, S. Changan, B. Bhushan, S. Singh, Delineating the inherent functional descriptors and biofunctionalities of pectic polysaccharides, Carbohydr. Polym. 269 (2021) 118319.
X.T. Le, L.-E. Rioux, S.L. Turgeon, Formation and functional properties of protein-polysaccharide electrostatic hydrogels in comparison to protein or polysaccharide hydrogels, Adv. Colloid Interface Sci. 239 (2017) 127-135.
H. Liu, X. Guo, J. Li, D. Zhu, J. Li, The effects of MgSO4, d-glucono-δ-lactone (GDL), sucrose, and urea on gelation properties of pectic polysaccharide from soy hull, Food Hydrocoll. 31 (2013) 137-145.
U.S.K. Madduma-Bandarage, S. V Madihally, Synthetic hydrogels: Synthesis, novel trends, and applications, J. Appl. Polym. Sci. 138 (2021) 50376.
A. Mahmood, D. Patel, B. Hickson, J. DesRochers, X. Hu, Recent progress in biopolymer-based hydrogel materials for biomedical applications, Int. J. Mol. Sci. 23 (2022) 1415.
A. Manzoor, A.H. Dar, V.K. Pandey, R. Shams, S. Khan, P.S. Panesar, J.F. Kennedy, U. Fayaz, S.A. Khan, Recent insights into polysaccharide-based hydrogels and their potential applications in food sector: A review, Int. J. Biol. Macromol. 213 (2022) 987-1006.
N. Ni, M.-J. Dumont, Protein-based hydrogels derived from industrial byproducts containing collagen, keratin, zein and soy, Waste and Biomass Valorization. 8 (2017) 285-300.
T. Nicolai, C. Chassenieux, Heat-induced gelation of plant globulins, Curr. Opin. Food Sci. 27 (2019) 18-22.
T.V.N. Nieto, Y. Wang, L. Ozimek, L. Chen, Improved thermal gelation of oat protein with the formation of controlled phase-separated networks using dextrin and carrageenan polysaccharides, Food Res. Int. 82 (2016) 95-103.
K. Nilsson, M. Johansson, C. Sandström, H.E. Röhnisch, M.S. Hedenqvist, M. Langton, Pasting and gelation of faba bean starch-protein mixtures, Food Hydrocoll. (2023) 108494.
B. Ozel, O. Aydin, M.H. Oztop, In vitro digestion of polysaccharide including whey protein isolate hydrogels, Carbohydr. Polym. 229 (2020) 115469.
R. Panahi, M. Baghban-Salehi, Protein-based hydrogels, in: Cellul. Superabsorbent Hydrogels, Springer, 2019: pp. 1561-1600.
D. Pasqui, M. De Cagna, R. Barbucci, Polysaccharide-based hydrogels: the key role of water in affecting mechanical properties, Polymers (Basel). 4 (2012) 1517-1534.
L.H. Reichembach, C.L. de Oliveira Petkowicz, New findings on acid-extractable pectins from soy hull, Carbohydr. Polym. 294 (2022) 119831.
J.M.S. Renkema, C.M.M. Lakemond, H.H.J. de Jongh, H. Gruppen, T. van Vliet, The effect of pH on heat denaturation and gel forming properties of soy proteins, J. Biotechnol. 79 (2000) 223-230.
S.S. Sahmat, M.Y. Rafii, Y. Oladosu, M. Jusoh, M. Hakiman, H. Mohidin, A systematic review of the potential of a dynamic hydrogel as a substrate for sustainable agriculture, Horticulturae. 8 (2022) 1026.
P. Sahoo, T.K. Barman, 5-ANN modelling of fractal dimension in machining, in: J.P.B.T.-M. and M.E. Davim (Ed.), Woodhead Publ. Rev. Mech. Eng. Ser., Woodhead Publishing, 2012: pp. 159-226. https://doi.org/https://doi.org/10.1533/9780857095893.159.
Z. Shao, A.S. Negi, C.O. Osuji, Role of interparticle attraction in the yielding response of microgel suspensions, Soft Matter. 9 (2013) 5492-5500.
V. Sinha, S. Chakma, Advances in the preparation of hydrogel for wastewater treatment: A concise review, J. Environ. Chem. Eng. 7 (2019) 103295.

* cited by examiner

METHOD TO MAKE HYDROGELS AND CELLULOSE FROM PECTIN- AND PROTEIN-CONTAINING CELLULOSIC BIOMASS

CROSS-REFERENCE TO RELATED APPLICATIONS

Priority is hereby claimed to provisional application Ser. No. 63/425,074, filed Nov. 14, 2022, which is incorporated herein by reference.

FEDERAL FUNDING STATEMENT

This invention was made with government support under 58-6010-0-010 awarded by the U.S. Department of Agriculture. The government has certain rights in the invention.

BACKGROUND

Gels are semisolid materials with a liquid phase entrapped in a three-dimensional network structure. Based on their textural and rheological properties, these materials provide many applications in the food, biomedical, pharmaceutical, cosmetics, wastewater remediation and agriculture industries. In recent years, natural polymer-based hydrogels (water-based gels) have been a topic of several studies due to their advantages (biocompatibility, biodegradability, accessibility, and renewability) over synthetic hydrogels.

More broadly, hydrogels are defined as a three-dimensional network of polymeric materials that can swell upon absorption of water while maintaining their structure by chemical or physical crosslinking of the constituent polymeric chains. Hydrogels can be categorized into different groups based on various criteria. These criteria include the source of the material (synthetic, natural, or hybrid), whether the material is crosslinked and how the crosslinking is achieved (chemically by covalent bonding; or physically by non-covalent bonding), biodegradability (biodegradable, non-biodegradable), polymeric structure (homopolymer, copolymer, interpenetrating network), and charge (neutral, ionic, amphoteric, and zwitterionic). Regarding source and polymeric structure, synthetic polymers, e.g., poly-2-hydroxyethyl methacrylate (pHEMA), polycaprolactone (PCL), polyvinyl alcohol (PVA), polyvinyl pyrrolidone (PVP), polylactic acid (PLA), polyacrylamide (PAM), polyethylene glycol (PEG), and their derivatives are the primary sources used for hydrogel fabrication on a commercial scale. See, for example, U. S. K. Madduma-Bandarage, S. V Madihally, Synthetic hydrogels: Synthesis, novel trends, and applications, *J. Appl. Polym. Sci.* 138 (2021) 50376. Soon after the development of the first synthetic hydrogel in 1960 by Wichterle and Lim using pHEMA (0. Wichterle, D. Lim, Hydrophilic gels for biological use, Nature. 185 (1960) 117-118), hydrogels were used to make soft contact lenses. In the ensuing years, the use of hydrogels has expanded significantly into fields including drug delivery, tissue engineering, wound dressing, wastewater remediation, agriculture, biosensors, cosmetics, and skincare products. Although synthetic hydrogels have desirable characteristics (e.g., high swelling and water-retention capacity, improved gel strength and firmness, more straightforward production processes, and extended shelf life), they are not without concerns. Among these concerns are their potential toxicity and lack of biocompatibility, along with environmental issues such as environmental degradability and waste disposal. Additionally, most synthetic hydrogels use polymers made from petrochemical feedstocks—making their prices fluctuate in unpredictable ways. Lastly, there has been a long-running desire to use abundantly available edible and affordable bioresources.

These concerns have drawn the attention of researchers toward renewable, bio-based hydrogels. See, for example, A. H. Karoyo, L. D. Wilson, A review on the design and hydration properties of natural polymer-based hydrogels, *Materials* (*Basel*). 14 (2021) 1095. The primary hydrogel-forming natural polymers include polypeptides (proteins) and polysaccharides; W. Wijaya, A. R. Patel, A. D. Setiowati, P. Van der Meeren, Functional colloids from proteins and polysaccharides for food applications, *Trends Food Sci. Technol.* 68 (2017) 56-69. Animal-based proteins such as collagen, gelatin, whey, elastin, and keratin and plant-based proteins like soy, zein, pea, faba bean, wheat gluten, and lentil are some examples of polypeptides used for hydrogel fabrication. (F. Zha, J. Rao, B. Chen, Plant-based food hydrogels: Constitutive characteristics, formation, and modulation, *Curr. Opin. Colloid Interface Sci.* 56 (2021) 101505; N. Ni, M.-J. Dumont, Protein-based hydrogels derived from industrial byproducts containing collagen, keratin, zein and soy, *Waste and Biomass Valorization.* 8 (2017) 285-300; and H. F. Darge, A. T. Andrgie, H.-C. Tsai, J.-Y. Lai, Polysaccharide and polypeptide based injectable thermo-sensitive hydrogels for local biomedical applications, *Int. J. Biol. Macromol.* 133 (2019) 545-563.) Pectin, agar, alginate, xanthan gum, starch, chitosan, chitin, hyaluronic acid, and cellulose derivatives are some of the polysaccharides utilized as building materials for producing natural hydrogels. See D. Pasqui, M. De Cagna, R. Barbucci, Polysaccharide-based hydrogels: the key role of water in affecting mechanical properties, *Polymers* (*Basel*). 4 (2012) 1517-1534; T. Zhu, J. Mao, Y. Cheng, H. Liu, L. Lv, M. Ge, S. Li, J. Huang, Z. Chen, H. Li, Recent progress of polysaccharide-based hydrogel interfaces for wound healing and tissue engineering, *Adv. Mater. Interfaces.* 6 (2019) 1900761; and A. Manzoor, A. H. Dar, V. K. Pandey, R. Shams, S. Khan, P. S. Panesar, J. F. Kennedy, U. Fayaz, S. A. Khan, Recent insights into polysaccharide-based hydrogels and their potential applications in food sector: A review, *Int. J. Biol. Macromol.* 213 (2022) 987-1006. Compared with homopolymers consisting of polysaccharides or proteins only, the combined biopolymer hydrogel often provides hierarchical microstructures of gels and diversified functional properties, depending on the intermolecular interactions between two biopolymers and their gelation mechanism. See X. Yang, A. Li, D. Li, Y. Guo, L. Sun, Applications of mixed polysaccharide-protein systems in fabricating multi-structures of binary food gels—A review, *Trends Food Sci. Technol.* 109 (2021) 197-210 and X. T. Le, L.-E. Rioux, S. L. Turgeon, Formation and functional properties of protein—polysaccharide electrostatic hydrogels in comparison to protein or polysaccharide hydrogels, *Adv. Colloid Interface Sci.* 239 (2017) 127-135.

There have been numerous reports on utilizing polysaccharide-protein mixtures as the building blocks of hydrogels. Some of the studied binary mixtures are konjac glucomannan/fish myofibrillar protein, low-methoxyl pectin (LMP)/pea protein, sorghum arabinoxylan/soy protein isolate (SPI), high-methoxyl sugar beet pectin/SPI, high methoxyl citrus pectin/whey protein isolate, and chitosan/gelatin, K-carrageenan/casein, dextrin/oat protein, and high-methoxyl sugar beet pectin/zein. See T. Zhang, S. Chen, X. Xu, X. Zhuang, Y. Chen, Y. Xue, C. Xue, N. Jiang, Effects of konjac glucomannan on physical properties and microstructure of fish myofibrillar protein gel: Phase behaviours involved, *Food Hydrocoll.* 134 (2023) 108034; D. Zhang, D. Chen, B. Patel, O. H. Campanella, Pectin as a natural agent for reinforcement of pea protein gel, *Carbohydr. Polym.* 298 (2022) 120038; J. Yan, L. Yin, Y. Qu, W. Yan, M. Zhang, J. Su, X. Jia, Effect of calcium ions concentration on the properties and microstructures of doubly induced sorghum arabinoxylan/soy protein isolate mixed gels, *Food Hydrocoll.* 133 (2022) 107997; E. G. Ates, E. B. Ozvural, M. H. Oztop, Understanding the role of d-Allulose and soy protein addition in pectin gels, *J. Appl. Polym. Sci.* 138 (2021) 49885; B. Ozel, 0. Aydin, M. H. Oztop, In vitro digestion of polysaccharide including whey protein isolate hydrogels, *Carbohydr. Polym.* 229 (2020) 115469; S. R. Derkach, Y. A. Kuchina, D. S. Kolotova, N. G. Voron'ko, Polyelectrolyte polysaccharide—gelatin complexes: Rheology and structure, *Polymers* (*Basel*). 12 (2020) 266; M. Tang, Y. Zhu, D. Li, B. Adhikari, L. Wang, Rheological, thermal and microstructural properties of casein/K-carrageenan mixed systems, *Lwt.* 113 (2019) 108296; T. V. N. Nieto, Y. Wang, L. Ozimek, L. Chen, Improved thermal gelation of oat protein with the formation of controlled phase-separated networks using dextrin and carrageenan polysaccharides, Food Res. Int. 82 (2016) 95-103; and S. Soltani, A. Madadlou, Two-step sequential cross-linking of sugar beet pectin for transforming zein nanoparticle-based Pickering emulsions to emulgels, *Carbohydr. Polym.* 136 (2016) 738-743, respectively. Despite the biocompatibility and biodegradability advantages of using biopolymers and the diversity of the sources of polysaccharides and proteins used in the literature studies, there is a drawback: the individual biopolymers from the animal or plant sources must be isolated. This not only significantly increases the cost of hydrogel production (due to the need for multi-stage downstream processing for isolation and purification), but also adversely influences the environment due the higher amounts of effluent discharged. These processing requirements significantly and adversely impact the economic feasibility and industrial scalability of hydrogel production from natural sources.

Soybeans are one of the most cultivated crops in the world. The seed coat of the soybean, i.e., soybean hull (SBH), is the primary byproduct of the soy industry. The SBH is separated from the bean during the dehulling step as a prerequisite for oil and protein extraction. Annual worldwide production of SBH runs from −18.0 to 28.7 million metric tons in 2020-2021. G. A. Bittencourt, L. P. de Souza Vandenberghe, K. Valladares-Diestra, L. W. Herrmann, A. F. M. de Mello, Z. S. Vasquez, S. G. Karp, C. R. Soccol, Soybean hulls as carbohydrate feedstock for medium to high-value biomolecule production in biorefineries: A review, *Bioresour. Technol.* 339 (2021) 125594. Although SBH is generated in enormous quantities, the vast majority of it is used in low-value applications, mostly as animal feed. A significant percentage of SBH is simply incinerated or landfilled, which raises additional environmental and health issues.

SUMMARY OF THE INVENTION

Disclosed herein is a method to make hydrogels from pectin- and protein-containing cellulosic biomass in a single step. In the method, the biomass is treated with an aqueous acidic solution for a time, at a temperature, and at a pH sufficient to yield a mixture containing biomass solids, hydrogels. The acid within the aqueous acidic solution may be added exogenously or may be formed in situ. In the preferred version, the novel approach produces three products without generating effluent:

1. A gel fraction: The pectin- and protein-containing hydrogel formed by the method is amphiphilic. It has several important utilities, including as a rheology modifier (i.e., an additive used to adjust the viscosity and non-Newtonian behavior of substances with complex microstructures), as an encapsulant for nutrients, bioactive materials, pharmaceutically active materials, and the like, and as an emulsion stabilizer in food, cosmetics, pharmaceuticals, paints, coatings, and adhesives 2. A solids fraction: The solids formed by the method are cellulose-rich and are useful for making a wide range of cellulose-based products, including but not limited to, microcrystalline cellulose, nanocrystalline cellulose, cellulose ethers, cellulose acetates, cellulose nitrates, and carboxymethyl cellulose.

3. A liquid fraction: The dissolved biomass mainly contains products from the degradation of pectin, protein, hemicellulose, and cellulose. It is useful in a wide range of applications, including but not limited to, bio-based films and coatings.

Unlike the methods reported in the literature, the present hydrogel fabrication method does not need to isolate a single component (polysaccharide or protein) from the lignocellulosic biomass. Separating individual components requires extensive, costly, and environmentally harmful downstream processing. The yield and properties of the hydrogel formed by the method are adjustable by varying the processing conditions of the feedstock (i.e., pH, time, and temperature).

Thus, disclosed herein is a method of making a hydrogel. In a first version, the method comprises treating a cellulosic biomass comprising pectin and protein with an aqueous acidic solution at a pH, at a temperature, and for a time sufficient to cause formation of at least a gel fraction comprising the hydrogel.

Another version of the method comprises treating a cellulosic biomass comprising pectin and protein with an aqueous acidic solution at a pH, at a temperature, and for a time sufficient to cause formation of at least a gel fraction comprising the hydrogel. The treated cellulosic biomass is then blended to yield a mixture. The mixture is then optionally cooled to, e.g., from about 10° C. to about 0° C., most preferably about 4° C., to yield a cooled mixture. The cooled mixture is then centrifuged to concentrate the gel fraction.

A specific version of the method comprises treating a cellulosic biomass comprising pectin and protein with an aqueous acidic solution at a pH, at a temperature, and for a time sufficient to cause formation of at least a gel fraction comprising the hydrogel. Then blending the treated cellulosic biomass to yield a mixture and cooling the mixture to a temperature of about 10° C. to about 0° C. to yield a cooled mixture. Lastly, the cooled mixture is centrifuged to concentrate the gel fraction.

The preferred pH of the treatment step is from about 1 to about 6, more preferably from about 1.8 to about 5.8. The preferred temperature of the treatment step is from about 30° C. to about 150° C., or from about 50° C. to about 95° C. The preferred time of the treatment step is from about 1 minute to about 180 minutes, more preferably from about 10 minutes to about 60 minutes. The preferred biomass for the method comprises, consists essentially of, or consists of soybean hull. It is preferred, but not required, that the hydrogel has a pectin-to-protein ratio of from about 0.1 to about 3.0. It is also preferred, but not required that cellulosic biomass is treated with the aqueous acidic solution at a liquid-to-solid ratio by mass of from about 1-to-1 to about 50-to-1, more preferably from about 5 to about 20.

Also disclosed is a hydrogel made by the method described and claimed herein.

SBH is one of the major byproducts of the soy industry, with a global annual production of approximately 20 million tons. More than 50% of that total is generated in the United States. This byproduct has much potential for high-value commercial utilization. The valorization of this low-cost biomass on an industrial scale could supplant its current low-value applications (mainly limited to animal feed). The unique chemical composition of SBH (high pectin and protein content) makes this biomass a promising candidate for hydrogel production. Most natural hydrogels are produced from pure/fractionated ingredients, such as pectin, protein, alginate, chitosan, and starch. The goal, achieved here, was to produce hydrogels from SBH without extracting specific components. The method thus results in more cost-effective and environmentally friendly processing with minimal effluent.

The properties of produced hydrogels are significantly affected by the applied processing conditions. Time, temperature, and pH of treatments were chosen as the independent factors, and a three-level face-centered central composite design (CCD) was used as the statistical method for the design of experiments (DOE). Selected levels of processing conditions are as follows: (T: 30-150° C., t: 1-180 min, pH: 1.0-6.0). The total number of trials was 20, including six replicates of the centroid. The effect of each processing condition and their interaction on the yield, water content, pectin/protein ratio, and viscoelasticity of the resulting hydrogels were evaluated using response surface methodology (RSM).

Abbreviations and Definitions

CCD=central composite design. GalA=D-galacturonic acid monohydrate. H=hydrogel with the highest pectin/protein ratio. Ip=isoelectric pH. L=hydrogel with the lowest pectin/protein ratio. LAOS=large amplitude oscillatory shear. LMP=low-methoxyl pectin. LVE=linear viscoelastic region. MC=moisture content. MHDP=3-phenylphenol (i.e., meta-hydroxy diphenyl). Pec/Pro=pectin/protein ratio. PAM=polyacrylamide. PCL=polycaprolactone. PEG=polyethylene glycol. pHEMA=poly-2-hydroxyethyl methacrylate. PLA=polylactic acid. PVA=polyvinyl alcohol. PVP=polyvinyl pyrrolidone. RSM=response surface methodology. SBH=soybean hull. SC=solids content. SPI=soy protein isolate. WHC=water-holding capacity.

All references to singular characteristics or limitations of the disclosed method shall include the corresponding plural characteristic or limitation, and vice-versa, unless otherwise specified or clearly implied to the contrary by the context in which the reference is made. The indefinite articles "a" and "an" mean "one or more."

The word "about" when applied to a variable means+/−10% of the stated value.

The phrase "acidic solution" means a solution having a pH less than 7. The solution can be made acidic using any suitable acid, such as, but not limited to, acetic acid ($CH_3C(=O)OH$), boric acid ($B(OH)_3$), chloric acid ($HClO_3$), citric acid ($CH_2COOH—C(OH)COOH—CH_2COOH$), hydrobromic acid (HBr), hydrochloric acid (HCl), hydrofluoric acid (HF), hydroiodic acid (HI), nitric acid ($HNO_3$), oxalic acid ($HO(O=)CC(=O)OH$), perchloric acid ($HClO_4$), sulfuric acid ($H_2SO_4$), and the like. HCl is preferred (but not required).

The word "biomass" is defined broadly herein to encompass all organic materials produced by plants and animals, such as cobs, husks, leaves, roots, seeds, shells, and stalks, as well as microbial and animal metabolic wastes (e.g., manure), without limitation. Common sources of biomass include (without limitation): (1) agricultural wastes, such as corn cobs and stalks, straw, seed hulls (including soybean hulls), sugarcane leavings, bagasse, nutshells, citrus peels, fruit and vegetable skins, egg shells, and manure from cattle, poultry, and hogs; (2) woody materials, such as wood or bark, sawdust, timber slash, and mill scrap; (3) municipal waste, such as waste paper and yard clippings; (4) energy crops, such as poplars, willows, switch grass, alfalfa, prairie bluestem, corn, soybean; and (5) coal, peat moss, and the like. The term "biomass-derived" refers to any reactant or material that can be fabricated from biomass by any means now known or developed in the future, including (without limitation) polysaccharides, monosaccharides, polyols, oxygenated hydrocarbons, sugars, starches, and the like.

The term "treating" refers to the act of touching, making contact, or of bringing to immediate or close proximity, including at the molecular level, for example, to bring about a chemical reaction, or a physical change, e.g., in a solution, in a mixture, or in a reaction mixture.

All combinations of method steps disclosed herein can be performed in any order, unless otherwise specified or clearly implied to the contrary by the context in which the referenced combination is made.

The method disclosed herein can comprise, consist of, or consist essentially of the essential elements and steps described herein, as well as any additional or optional ingredients, components, or limitations described herein or otherwise useful in organic chemistry.

DETAILED DESCRIPTION OF THE INVENTION

Figure 1A:
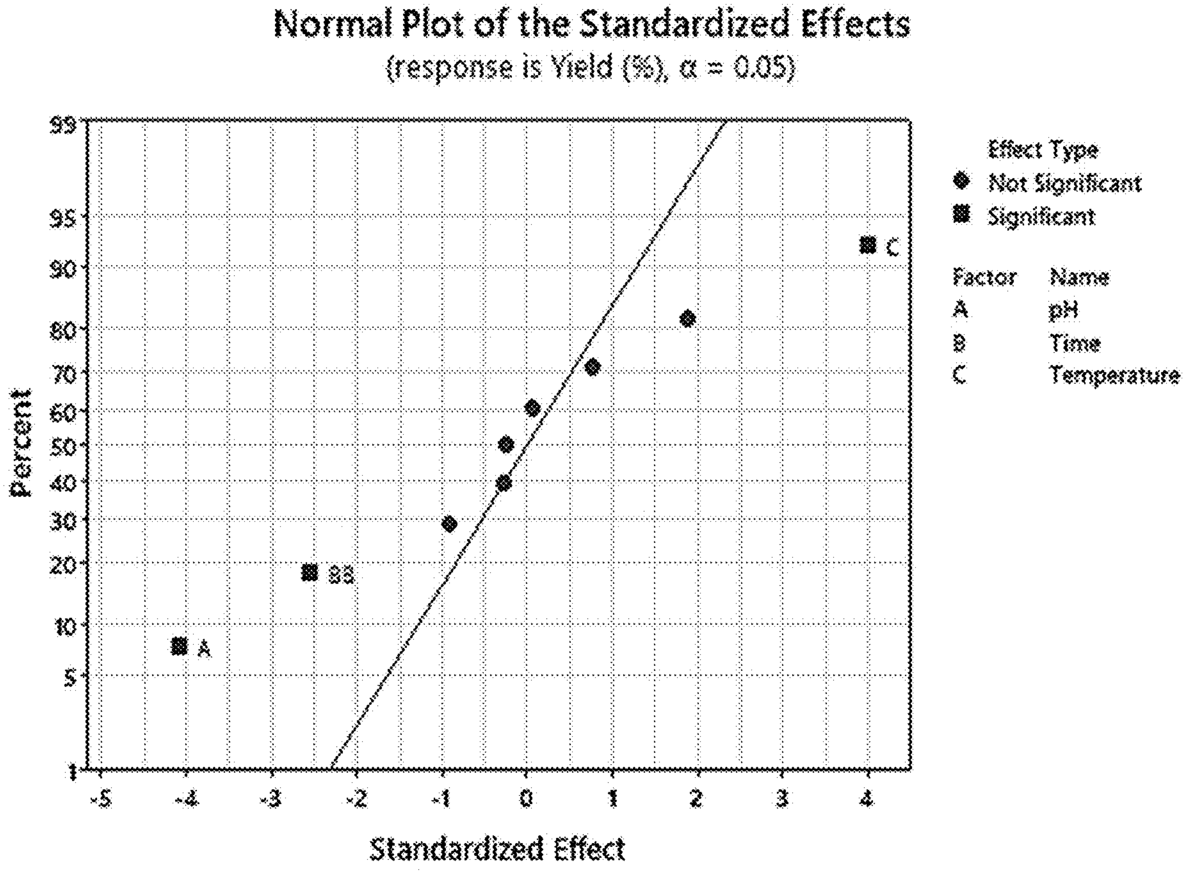
FIG. 1A is a normal plot of standardized effects based on pH (A), time (B), and temperature (C); response is yield (%). $\alpha$=0.05. ■=significant result; ●=insignificant result.

Newly developed and disclosed herein is a method of producing a hydrogel from whole SBH. SBH is a pectin- and protein-rich biomass and can be used as a feedstock to make a hydrogel in single-step combining heat and acid gelation. Acid-extracted SBH pectin is a low-methyl pecting (LMP; i.e., a degree of methylation of <50%, according to recent literature data). See L. H. Reichembach, C. L. de Oliveira Petkowicz, New findings on acid-extractable pectins from soy hull, *Carbohydr. Polym.* 294 (2022) 119831. LMP gelation follows one of the two mechanisms: (I) electrostatic complex formation with divalent cations, mainly $Ca^{2+}$, according to the egg-box model, and (II) conformational transition from an extended two-fold structure to a more compact three-fold structure. The egg-box model is more likely to happen when the pH is above the pKa of pectin, i.e., 3.5, with pectin in a more dissociated and ionized form. The conformational transition mechanism occurs at extremely low pH values where pectin is uncharged and electrostatic repulsion between carboxylic acid groups is suppressed, making them act as hydrogen donors, P. M. Gilsenan, R. K. Richardson, E. R. Morris, Thermally reversible acid-induced gelation of low-methoxy pectin, *Carbohydr. Polym.* 41 (2000) 339-349. Heat denaturation is usually a prerequisite for the gelation of globular protein (e.g., soy protein) because it unfolds the protein, cleaves the disulfide bonds, and exposes previously occluded polar side chains, as well as sulfhydryl and hydrophobic groups to the surface. These functional groups contribute to aggregate formation through covalent links (disulfide bonds) and non-covalent bonding (hydrogen bonding, electrostatic interactions, and hydrophobic interactions), followed by percolation to a 3D gel network. The interpolymer interactions and gelation mechanism/conditions depend on single biopolymers' inherited physicochemical and structural properties, the concentration ratio of constituting biopolymers, and extrinsic factors such as temperature, pH, shearing, and ionic strength. Here, the effect of pH, time, and temperature on the hydrogel yield, solids content, and pectin/protein (pec/pro) ratio was evaluated using central composite design (CCD) and response surface methodology (RSM), followed by the rheological analysis of the selected hydrogels.

Materials and Chemicals:

The materials and chemicals used were as follows: course ground SBH (Republic Mills, Inc., Napoleon, Ohio); sodium tetraborate (anhydrous, 99.5%) from BeanTown Chemical Corporation (Hudson, New Hampshire); D-galacturonic acid monohydrate (GalA, 97%) from Alfa Aesar (Ward Hill, Massachusetts); 3-phenylphenol (i.e., meta-hydroxy diphenyl "MHDP") from TCI America (Portland, Oregon); sodium hydroxide (NaOH) pellets from Macron Fine Chemicals (Phillipsburg, New Jersey); hydrochloric acid (HCl, 36.5-38% Assay) and EDTA disodium salt dihydrate from BDH Chemicals (VWR, Radnor, Pennsylvania); sulfuric acid ($H_2SO_4$, 95-98% Assay) from J. T. Baker (Phillipsburg, New Jersey).

Experimental Design Using RSM:

To study how changing processing conditions (pH, time, and temperature) and their interactions affect the properties of the fabricated SBH-based hydrogel with a lower number of experimental runs and draw objective conclusions, experiments were designed using RSM. For this purpose, Minitab® software (Minitab, LLC., State College, Pennsylvania) was used by applying the face-centered CCD design option. Three factors of pH, temperature, and time were selected as the independent factors with three levels, with $\alpha=1$. The total number of trials using RSM is 20 (with six repeats of the center point to ensure the model's repeatability) as opposed to the 27 trials required for the full factorial design. The details of the experimental runs are presented in Table 1, with low, high, and mid values of factors coded with −1, 1, and 0 (respectively) in the parentheses.

TABLE 1

Details of experimental design using pH, time, and temperature as independent factors

| Run Order | Point Type | Blocks | pH | Time (min) | Temperature (° C.) |
|---|---|---|---|---|---|
| 1 | 1 | 1 | 1.8 (−1) | 10 (−1) | 65 (−1) |
| 2 | 1 | 1 | 5.8 (1) | 60 (1) | 65 (−1) |
| 3 | 1 | 1 | 5.8 (1) | 10 (−1) | 95 (1) |
| 4 | 1 | 1 | 1.8 (−1) | 60 (1) | 95 (1) |
| 5 | 0 | 1 | 3.8 (0) | 35 (0) | 80 (0) |
| 6 | 0 | 1 | 3.8 (0) | 35 (0) | 80 (0) |
| 7 | 1 | 2 | 5.8 (1) | 10 (−1) | 65 (−1) |
| 8 | 1 | 2 | 1.8 (−1) | 60 (1) | 65 (−1) |
| 9 | 1 | 2 | 1.8 (−1) | 10 (−1) | 95 (1) |
| 10 | 1 | 2 | 5.8 (1) | 60 (1) | 95 (1) |
| 11 | 0 | 2 | 3.8 (0) | 35 (0) | 80 (0) |
| 12 | 0 | 2 | 3.8 (0) | 35 (0) | 80 (0) |
| 13 | −1 | 3 | 1.8 (−1) | 35 (0) | 80 (0) |
| 14 | −1 | 3 | 5.8 (1) | 35 (0) | 80 (0) |
| 15 | −1 | 3 | 3.8 (0) | 10 (−1) | 80 (0) |
| 16 | −1 | 3 | 3.8 (0) | 60 (1) | 80 (0) |
| 17 | −1 | 3 | 3.8 (0) | 35 (0) | 65 (−1) |
| 18 | −1 | 3 | 3.8 (0) | 35 (0) | 95 (1) |
| 19 | 0 | 3 | 3.8 (0) | 35 (0) | 80 (0) |
| 20 | 0 | 3 | 3.8 (0) | 35 (0) | 80 (0) |

Reaction times, temperatures, and pH's extending beyond the values stated in Table 1 are explicitly with the scope of the method disclosed and claimed herein.

Hydrogel Fabrication:

A combination of thermochemical heat-induced and acid-induced gelation was used to fabricate hydrogels from SBH. First, an aqueous acidic dispersion of SBH was prepared by mixing the biomass with distilled water and concentrated HCl (for pH adjustment) at a liquid to solid (L/S) ratio of 9. Then the mixture was heated for 60 minutes, and immediately cooled down to room temperature in an ice bath. After this step, the heat- and acid-treated SBH was blended for 30 minutes (in 5 minutes intervals to ensure room-temperature blending). The resultant SBH mixture was kept at 4° C. overnight and centrifuged at 9500 RPM for 15 minutes to separate it into three fractions: solid, hydrogel, and liquid. Although, the hydrogel fraction is the focus, it is worth noting that besides the main hydrogel product, the separated insoluble fibrous solids and solubilized liquid fractions can be used as precursors of cellulose/cellulose derivatives and films/coating production, respectively, making the integrated multi-product approach highly economical and scalable.

Yield, Solids Content, and Composition of Hydrogel:

Each of the twenty hydrogels produced according to Table 1 were tested for their yield, solids content and pectin and protein percentage. The yield (%) was calculated based on the wet weight of hydrogels multiplied by the corresponding solids content divided by the initial SBH weight. The solids content (%) of the samples was calculated using the following formula: SC (%)=100-MC (%), where SC and MC are solids and moisture contents, respectively. MC of hydrogels was determined by drying 5 to 6 grams of each sample in a HC 103 moisture analyzer (Metier Toledo, Columbus, Ohio) operating at 111° C.

Quantifying the pectin and protein content of hydrogels was done on the freeze-dried samples. Pectin content was determined as GalA content according to the modified "MHDP" (meta-hydroxy diphenyl, i.e., 3-phenylphenol) colorimetric method. P. K. Kintner Ill, J. P. Van Buren, Carbohydrate interference and its correction in pectin analysis using the m-hydroxydiphenyl method, *J. Food Sci.* 47

(1982) 756-759. The absorbance of samples was measured using a Thermo Scientific™ GENESYS™ 10S UV-Vis spectrophotometer, and D-GalA standards of 0-100 mg/L were used for calibration curve generation. Protein content was determined indirectly through nitrogen content (N) analysis by the combustion method using a TruMac Nitrogen Analyzer (Leco Corporation, St. Joseph, Michigan) and protein conversion factor (protein content=N*6.25) with EDTA as the standard. The pec/pro ratio was calculated for each sample based on the values obtained through the experimental techniques noted herein.

Response Surface Regression:

A full quadratic model including all individual factors (pH, time, temperature), squared terms (pH*pH, time*time, temperature*temperature), and 2-way interaction terms (pH*time, pH*temperature, time*temperature) was used to conduct a regression analysis on yield and pec/pro ratio as the selected responses. The regression models, corresponding residual plots, and statistically significant factors were obtained from the Minitab software model reports.

Rheological Characterization:

The rheological behavior of selected SBH hydrogels was tested using a stress-controlled magnetic-bearing rheometer (AR-G2, TA Instruments, New Castle, Delaware) equipped with a 40-mm parallel plate at a gap size of 500 μm. (See J. Yang, M. Shen, T. Wu, Y. Luo, M. Li, H. Wen, J. Xie, Role of salt ions and molecular weights on the formation of *Mesona chinensis* polysaccharide-chitosan polyelectrolyte complex hydrogel, *Food Chem.* 333 (2020) 127493.) All tests were done using a solvent trap to avoid moisture loss during analysis. A strain sweep test was performed at 25° C. from 0.1% to 100% at a constant angular frequency of 1 rad/s to determine the linear viscoelastic region (LVE) for samples. Based on the results, the frequency sweep test was performed at a constant strain of 0.3%, 25° C. and 0.1 to 100 rad/s. The steady-state test was conducted to evaluate the flow behavior of hydrogel samples under shear rates of 0.1-100 (1/s) at a temperature of 25° C.

Hydrogel Yield and Composition:

The hydrogel production yield, solids content, and the percent weight of pectin and protein in each gel was determined. The results are presented in Table 2. The sample numbers and the corresponding processing conditions are the same as the run orders in the experimental design (Table 1). The results show the significant effect of processing conditions on the hydrogel formation efficiency, with yields ranging from 1.54% to 29.37% and solids contents of 8-16.55%. Pectin (GalA) and protein contents in the fabricated hydrogels ranged from 10.00% to 19.58% and 18.29 to 22.36%, respectively, resulting in pec/pro ratios of from 0.47 to 1.03. To better understand the effect of processing conditions on the hydrogel properties, yield (the combined contribution of weight and solids content) and pec/pro ratio (the combined contribution of pectin and protein content) were selected as model responses for regression using RSM.

TABLE 2

Yield and composition of SBH hydrogels under different processing conditions

| Sample | Yield (%) | Solids Content (%) | Pectin (%) | Protein (%) | Pec/Pro Ratio |
|---|---|---|---|---|---|
| 1 | 4.23 | 14 | 13.10 | 19.81 | 0.66 |
| 2 | 2.96 | 16 | 11.34 | 22.36 | 0.51 |
| 3 | 7.96 | 13.43 | 19.58 | 20.84 | 0.94 |
| 4 | 21.37 | 11.52 | 12.66 | 19.22 | 0.66 |
| 5 | 12.19 | 15.39 | 13.28 | 22.10 | 0.60 |
| 6 | 12.15 | 15.12 | 12.98 | 21.26 | 0.61 |
| 7 | 1.54 | 11.89 | 10.88 | 20.67 | 0.52 |
| 8 | 9.6 | 8 | 13.68 | 20.48 | 0.67 |
| 9 | 18.11 | 11.26 | 18.87 | 18.29 | 1.03 |
| 10 | 12.28 | 11.68 | 13.75 | 20.53 | 0.67 |
| 11 | 12.15 | 15.48 | 12.60 | 21.88 | 0.58 |
| 12 | 12.63 | 15.53 | 12.41 | 20.86 | 0.59 |
| 13 | 29.37 | 13.37 | 13.42 | 20.91 | 0.64 |
| 14 | 8.88 | 15.67 | 12.58 | 18.60 | 0.68 |
| 15 | 11.42 | 12.98 | 15.53 | 21.36 | 0.73 |
| 16 | 6.27 | 14.51 | 11.20 | 22.21 | 0.50 |
| 17 | 10.91 | 16.55 | 10.00 | 21.27 | 0.47 |
| 18 | 17.57 | 12.86 | 11.08 | 19.32 | 0.57 |
| 19 | 12.67 | 15.41 | 12.96 | 21.58 | 0.60 |
| 20 | 12.69 | 15.13 | 12.60 | 21.83 | 0.58 |

Response Surface Regression:

Yield:

Regression analysis of yield versus pH, time, and temperature was conducted based on the experimental values obtained for the 20 hydrogels using the Minitab software, and the following regression equation (1) was generated by the software:

$$\text{Yield}(\%)=-28.9-7.15\ \text{pH}+0.708\ \text{Time}+0.85\ \text{Temperature}+1.086\ \text{pH*pH}-0.00950\ \text{Time*Time}-0.0024\ \text{Temperature*Temperature}-0.0072\ \text{pH*Time}-0.0413\ \text{pH*Temperature}+0.00026\ \text{Time*Temperature} \quad \text{Equation (1)}$$

The equation represents all terms for a full quadratic model, i.e., linear, square, and 2-way interactions. The reported coefficient of determination ($R^2$) is 85.17%. However, as depicted in the normal plot of the standardized effect, FIG. 1A, only three terms were statistically significant (pH, temperature, and time*time). Many factors with no significant effect on response could lead to an overestimated $R^2$, and stepwise elimination techniques, such as the backward elimination method, have been proposed to remove the non-significant factors and improve model accuracy. See W. Wynant, M. Abrahamowicz, Flexible estimation of survival curves conditional on non-linear and time-dependent predictor effects, Stat. Med. 35 (2016) 553-565. The backward elimination with $\alpha$=0.05 to remove was used to reevaluate the goodness of fit, and a more realistic $R^2$ of 75.13% was achieved with the following modified equation (2):

$$\text{Yield}(\%)=-12.39-2.453\text{pH}+0.546\text{Time}+0.3203\text{Temperature}-0.00728\text{Time*Time} \quad \text{Equation (2)}$$

The significant model factors affecting the yield (%) are labeled in FIG. 1A. The plot shows that the yield increases linearly with an increase in temperature and a decrease in pH, while exponential yield increase is observed with a lowering in the heating time in the studied range. Although, the effect of pH and temperature on hydrogel yield is more significant than time, being further away from the line in FIG. 1A. The model implies no significant contribution of interaction terms on the obtained yields. In explaining the factors that influence hydrogel yield, it is essential to remember that the yield depends on the extractability of pectin and protein by disrupting the compact cell wall structure of the biomass. The yield is also impacted (upward or downward) by the gelling ability of the released pectin and protein.

Increased acidity and higher temperatures are reported to increase pectin extraction from the middle lamella in the cell wall. F. Gutohrlein, S. Drusch, S. Schalow, Extraction of low methoxylated pectin from pea hulls via RSM, *Food Hydrocoll.* 102 (2020) 105609. As for protein, alkaline or acidic conditions far away from the isoelectric pH (Ip) can result in better protein extraction from biomass due to the increased net charge and improved solubility. H. Kamal, C. F. Le, A. M. Salter, A. Ali, Extraction of protein from food waste: An overview of current status and opportunities, *Compr. Rev. Food Sci. Food Saf.* 20 (2021) 2455-2475. Soy protein has two major subunits, glycinin (11S) and β-conglycinin (βCG, 7S), with neutral pH denaturation temperatures of 90° C. and 74° C., respectively. The denaturation temperatures shift to lower values with a decrease in pH level. Therefore, higher temperature combined with higher acidity ensures the gelation of both subunits and increases the soy protein contribution to the final hydrogel. Also, higher temperatures increase the aggregate formation and growth rate, resulting in faster gel formation, as reported by Nicolai and Chassenieux (2019) on investigating the heat-induced globular protein gelation. T. Nicolai, C. Chassenieux, Heat-induced gelation of plant globulins, *Curr. Opin. Food Sci.* 27 (2019) 18-22. In terms of the effect of interpolymer interactions, low pH and increased temperature favor pectin de-esterification and an increase the number of free carboxylic acid groups on pectin's surface. This can improve the hydrogen bonding to amide groups in soy protein at low pH and increase the overall hydrogel yield. This is consistent with earlier observations on acid-induced gelation of amidated LMP. See M. Dominiak, K. M. Sdndergaard, J. Wichmann, S. Vidal-Melgosa, W. G. T. Willats, A. S. Meyer, J. D. Mikkelsen, Application of enzymes for efficient extraction, modification, and development of functional properties of lime pectin, *Food Hydrocoll.* 40 (2014) 273-282 and F. Capel, T. Nicolai, D. Durand, P. Boulenguer, V. Langendorff, Calcium and acid induced gelation of (amidated) low methoxyl pectin, *Food Hydrocoll.* 20 (2006) 901-907. Also, the higher degree of protein denaturation afforded under acidic conditions and elevated temperatures provides a higher probability of hydrophobic interactions between the exposed nonpolar groups of protein and available acetyl/methyl groups of pectin. However, due to the limited availability of the hydrophobic groups in the case of SBH pectin, hydrophobic interactions are more likely of a protein-protein type, with less contribution attributed to the pectin-protein association.

The hydrogel yield is inversely correlated to the heating time, and the dependency is of the second order (BB term in FIG. 1A), which means that an increase in the heating time reduces the overall yield exponentially. This factor-response correlation can probably be attributed to the fact that with longer than needed heat treatment of SBH, especially at low pH and high temperatures, acid hydrolysis and degradation of pectin and protein overweighs the time's contribution to the gel formation. Also, the room-temperature mechanical treatment for 30 min, which is the same for the fabrication of all hydrogels, decreases the heating time required for extracting pectin/protein from SBH and their gelation without extensive hydrolysis and yield reduction.

Figure 1B:
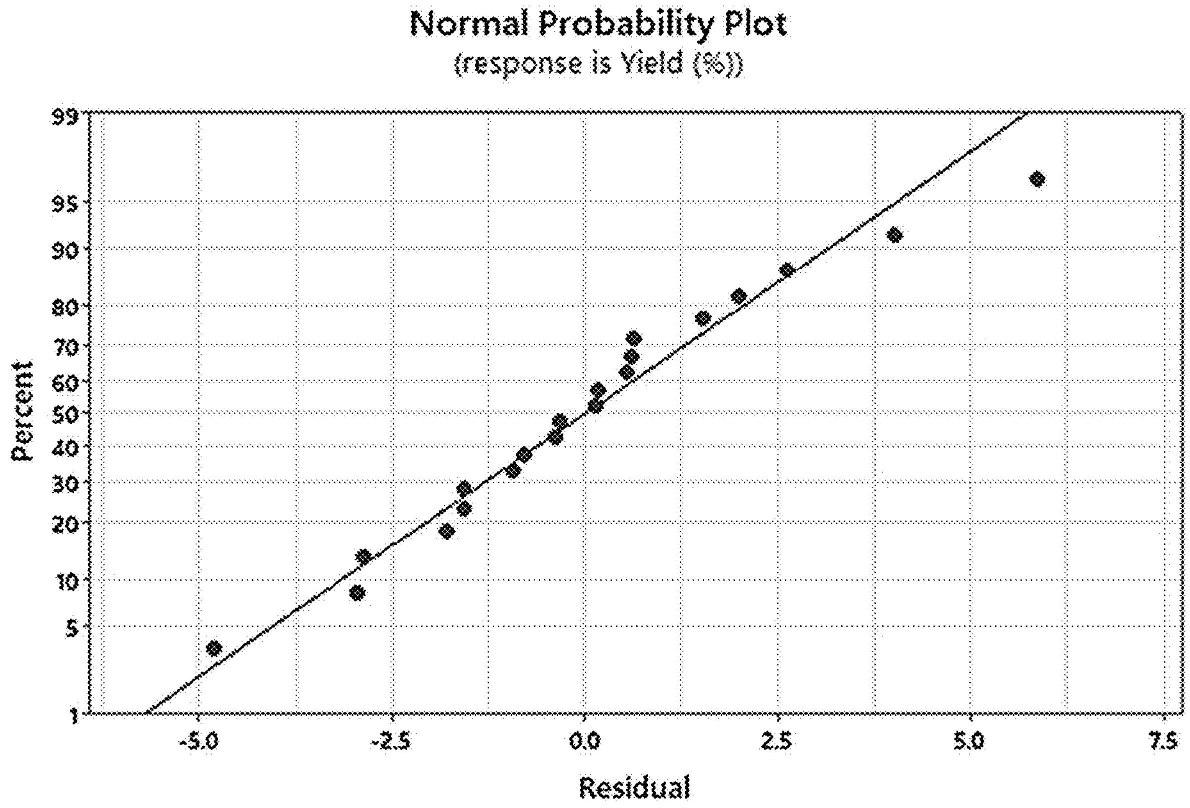
FIG. 1B is a normal probability plot for regression analysis of yield (response is yield, %).

The normal probability plot (FIG. 1B) shows data points are randomly located above and below the diagonal line without a specific trend, indicating a normal distribution with no evidence of skewness or kurtosis. The values are close to the diagonal line, an indication of a good model fitting. However, relatively high residual values (FIG. 1B) and low adjusted and predicted $R^2$ are evidence of some lack of fit. See Tables 3-8. Several factors can be responsible for the model's complexity and resultant reduced model accuracy, including ionic strength, and the type and valency of available ions changing the charge density and distribution in the system, amino acid composition, and aggregation mechanisms of soy protein on subunit level, and pectin structural properties (molecular weight, monosaccharide composition, acetyl/methyl content, distribution of linear and branched regions), which can directly affect the gelling ability of components in the system.

TABLE 3

| Response Surface Regression: Yield (%) | | | | | |
|---|---|---|---|---|---|
| Term | Coef | SE Coef | T-Value | P-Value | VIF |
| Constant | 12.76 | 1.47 | 8.71 | 0.000 | |
| Blocks | | | | | |
| 1 | −1.20 | 1.28 | −0.94 | 0.375 | 1.56 |
| 2 | −0.29 | 1.28 | −0.23 | 0.825 | 1.56 |
| 3 | 1.49 | 1.31 | 1.14 | 0.289 | * |
| pH | −4.91 | 1.20 | −4.09 | 0.003 | 1.00 |
| Time | 0.92 | 1.20 | 0.77 | 0.464 | 1.00 |
| Temperature | 4.80 | 1.20 | 4.01 | 0.004 | 1.00 |
| pH*pH | 4.34 | 2.32 | 1.88 | 0.097 | 1.86 |
| Time*Time | −5.93 | 2.32 | −2.56 | 0.033 | 1.86 |
| Temperature*Temperature | −0.54 | 2.32 | −0.23 | 0.821 | 1.86 |
| pH*Time | −0.36 | 1.34 | −0.27 | 0.794 | 1.00 |
| pH*Temperature | −1.24 | 1.34 | −0.92 | 0.383 | 1.00 |
| Time*Temperature | 0.10 | 1.34 | 0.07 | 0.943 | 1.00 |

TABLE 4

| Model Summary | | | |
|---|---|---|---|
| S | R-sq | R-sq(adj) | R-sq(pred) |
| 3.79357 | 85.17% | 64.79% | 0.00% |

TABLE 5

| Analysis of Variance | | | | | |
|---|---|---|---|---|---|
| Source | DF | Adj SS | Adj MS | F-Value | P-Value |
| Model | 11 | 661.437 | 60.131 | 4.18 | 0.026 |
| Blocks | 2 | 21.044 | 10.522 | 0.73 | 0.511 |
| Linear | 3 | 480.069 | 160.023 | 11.12 | 0.003 |
| pH | 1 | 240.688 | 240.688 | 16.72 | 0.003 |
| Time | 1 | 8.501 | 8.501 | 0.59 | 0.464 |
| Temperature | 1 | 230.880 | 230.880 | 16.04 | 0.004 |
| Square | 3 | 118.620 | 39.540 | 2.75 | 0.113 |
| pH*pH | 1 | 50.675 | 50.675 | 3.52 | 0.097 |
| Time*Time | 1 | 94.549 | 94.549 | 6.57 | 0.033 |
| Temperature*Temperature | 1 | 0.783 | 0.783 | 0.05 | 0.821 |
| 2-Way Interaction | 3 | 13.398 | 4.466 | 0.31 | 0.818 |
| pH*Time | 1 | 1.044 | 1.044 | 0.07 | 0.794 |
| pH*Temperature | 1 | 12.276 | 12.276 | 0.85 | 0.383 |
| Time*Temperature | 1 | 0.078 | 0.078 | 0.01 | 0.943 |
| Error | 8 | 115.129 | 14.391 | | |
| Lack-of-Fit | 5 | 115.013 | 23.003 | 593.87 | 0.000 |
| Pure Error | 3 | 0.116 | 0.039 | | |
| Total | 19 | 776.567 | | | |

TABLE 6

| Response Surface Regression: Yield (%)Backward Elimination of Terms $\alpha$ to remove = 0.05 | | | | | |
|---|---|---|---|---|---|
| Term | Coef | SE Coef | T-Value | P-Value | VIF |
| Constant | 14.12 | 1.13 | 12.45 | 0.000 | |
| pH | −4.91 | 1.13 | −4.32 | 0.001 | 1.00 |
| Time | 0.92 | 1.13 | 0.81 | 0.429 | 1.00 |
| Temperature | 4.80 | 1.13 | 4.23 | 0.001 | 1.00 |
| Time*Time | −4.55 | 1.60 | −2.83 | 0.013 | 1.00 |

TABLE 7

| Model Summary | | | |
|---|---|---|---|
| S | R-sq | R-sq(adj) | R-sq(pred) |
| 3.58814 | 75.13% | 68.50% | 55.91% |

TABLE 8

| Analysis of Variance | | | | | |
|---|---|---|---|---|---|
| Source | DF | Adj SS | Adj MS | F-Value | P-Value |
| Model | 4 | 583.445 | 145.861 | 11.33 | 0.000 |
| Linear | 3 | 480.069 | 160.023 | 12.43 | 0.000 |
| pH | 1 | 240.688 | 240.688 | 18.69 | 0.001 |
| Time | 1 | 8.501 | 8.501 | 0.66 | 0.429 |
| Temperature | 1 | 230.880 | 230.880 | 17.93 | 0.001 |
| Square | 1 | 103.376 | 103.376 | 8.03 | 0.013 |
| Time*Time | 1 | 103.376 | 103.376 | 8.03 | 0.013 |
| Error | 15 | 193.121 | 12.875 | | |
| Lack-of-Fit | 12 | 193.005 | 16.084 | 415.24 | 0.000 |
| Pure Error | 3 | 0.116 | 0.039 | | |
| Total | 19 | 776.567 | | | |

Among these factors, ionic strength is the only extrinsic factor, and its addition to the model could enhance the predictability of hydrogel formation yield. SBH has large amounts of minerals in its structure. These minerals could be released into the soluble fraction during the combined heat and acid treatments. See Table 9. Some of the possible influences of these cations on the gelation mechanism could be the adverse effect on electrostatic interpolymer bonding when pKa of pectin<pH<Ip of protein (i.e., pH=3.8) by electrostatic shielding of the negative charges on pectin, neutralization of negative charge on proteins at pH>Ip, decrease or increase in the contribution of LMP gelation through electrostatic bonding with divalent cations, especially $Ca^{2+}$, and forming egg-box model in pH>pKa of pectin (i.e., pH=3.8 and 5.8), as well as inhibiting protein-protein or pectin-pectin electrostatic repulsion when they carry the same charge.

TABLE 9

| Elemental Analysis of SBH using Inductively Coupled Plasma Optical Emission Spectroscopy (ICP-OES)* | |
|---|---|
| Element | Content (ppm) |
| Phosphorus | 654 ± 2 |
| Potassium | 10424 ± 142 |
| Calcium | 4186 ± 228 |
| Magnesium | 3672 ± 143 |
| Iron | 289 ± 2 |
| Manganese | 18 ± 1 |

TABLE 9-continued

| Elemental Analysis of SBH using Inductively Coupled Plasma Optical Emission Spectroscopy (ICP-OES)* | |
|---|---|
| Element | Content (ppm) |
| Boron | 15.5 ± 0.5 |
| Copper | 6.8 ± 0.4 |
| Zinc | 36 ± 2 |
| Aluminum | 62 ± 5 |
| Sodium | 139 ± 2 |

*Elemental analysis of SBH was done according to the following procedure:

Approximately 0.50-10 g dried solid samples were weighed and transferred into ceramic crucibles. The crucibles were placed in a muffle furnace with a set temperature of 500° C. Samples were kept in the furnace overnight, allowed to cool down, and digested by mixed solution of 1 N nitric acid and 1 N hydrochloric acid on a hot plate at ~168° C. Hydrolysate were separated using a Whatman No. 1 filter paper and brought to volume in a 100 ml volumetric flask using deionized water. Finally, the resultant solutions were analyzed by Inductively Coupled Plasma Optical Emission Spectroscopy (Vista-MPX ICP-OES Radial Spectrometer, Varian Inc., USA) calibrated with standard concentrations of the desired elements. (Odom, John W., and Mama B. Koné. "Elemental analysis procedures used by the Auburn University Department of Agronomy and Soils." (1997).)

Another determinant factor in decreasing the predictability of hydrogel yield is that the calculation is based on the solids content and hence, the water holding capacity (WHC) of the hydrogel matrix. Because factors like the interpolymer and polymer-water interactions, conformational arrangements of pectin/protein, and their morphologies can significantly influence the WHC of the fabricated hydrogel, the predictability of its behavior solely based on the processing conditions can add uncertainty and lack of fit to the yield as a model response.

Pectin/Protein ("Pec/Pro") Ratio:

Using the pec/pro ratio calculated based on the pectin and protein contents (%) of hydrogels (Table 2) as the model response, a full quadratic regression was performed to evaluate the effect of processing conditions. The following equation (3) was reported by the Minitab software:

$$\text{Pec/Pro Ratio} = -0.791 - 0.2779\text{pH} + 0.00667\text{Time} + 0.0402\text{Temperature} + 0.02401\text{pH*pH} + 0.000084\text{Time*Time} - 0.000183\text{Temperature*Temperature} + 0.000193\text{pH*Time} + 0.000894\text{pH*Temperature} - 0.000210\text{Time*Temperature} \quad \text{Equation 3}$$

Figure 2A:
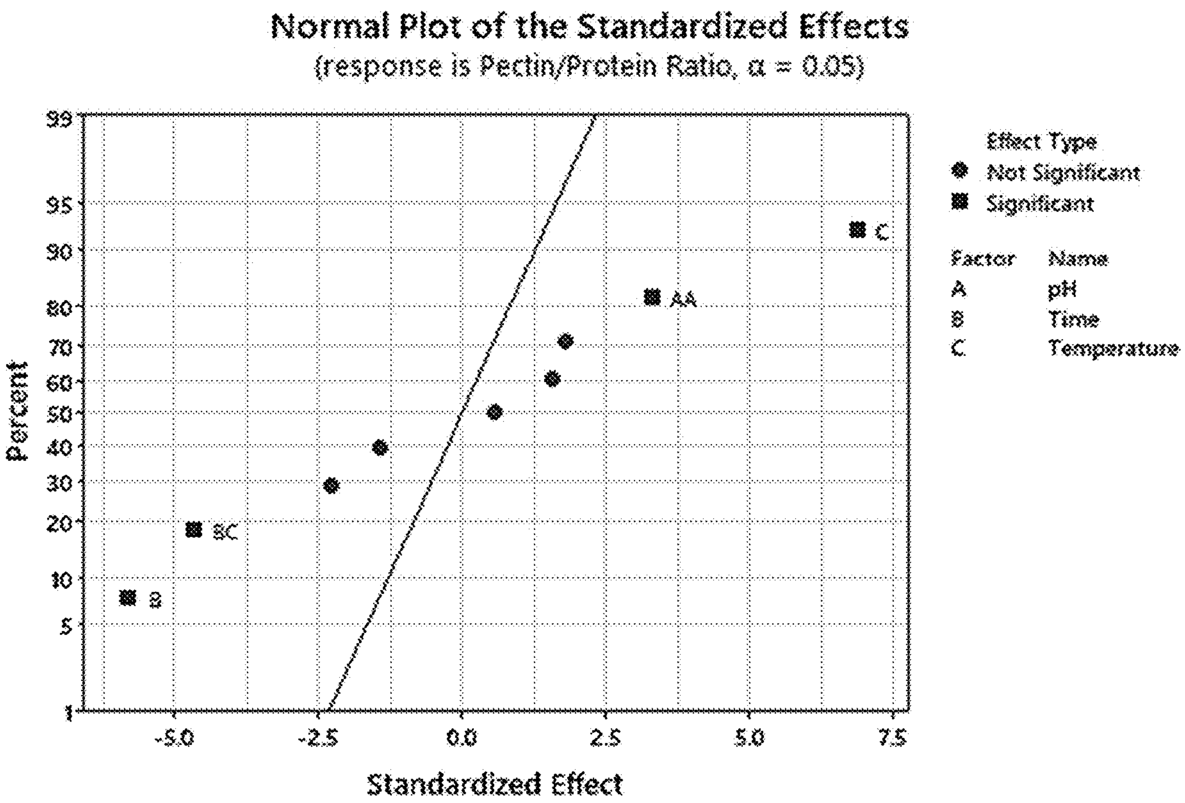
FIG. 2A is a normal plot of standardized effects based on pH (A), time (B), and temperature (C); response is pectin/protein ratio. $\alpha$=0.05. ■=significant result; ♦=insignificant result.
Figure 2B:
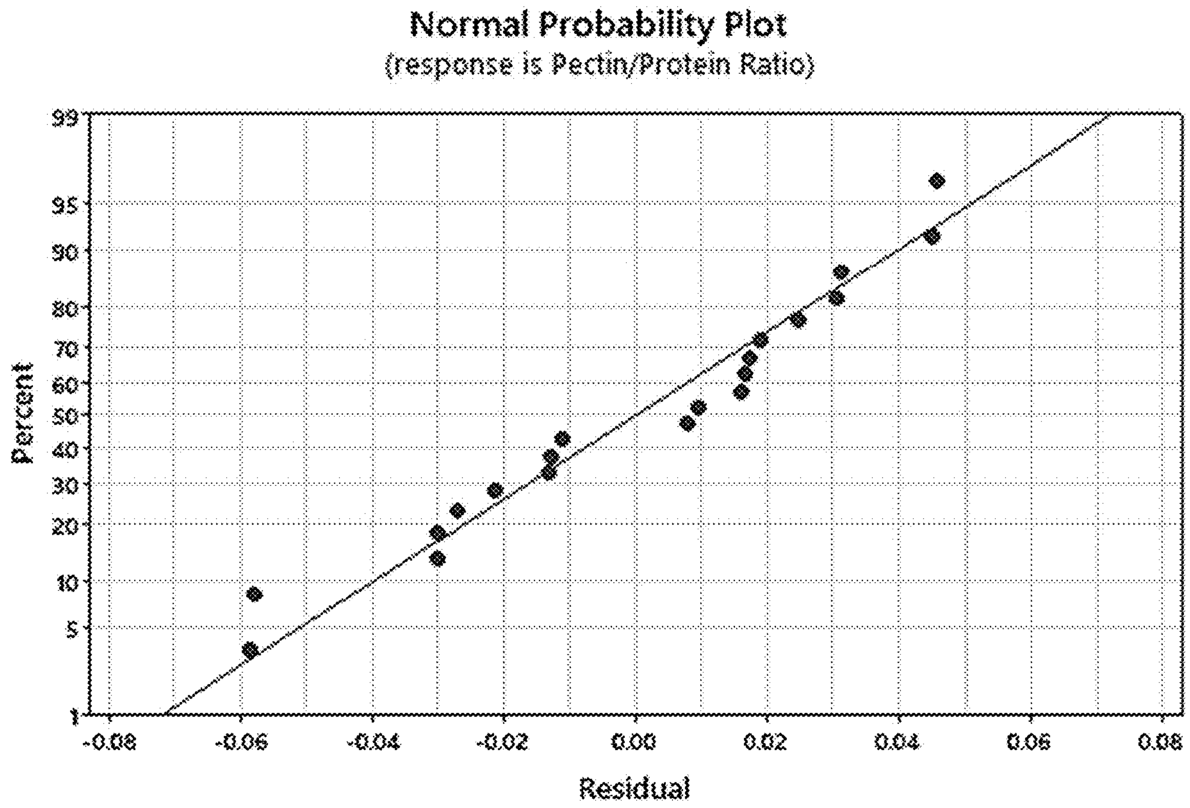
FIG. 2B is a normal probably plot for regression analysis (response is pectin/protein ratio).
Figure 2C:
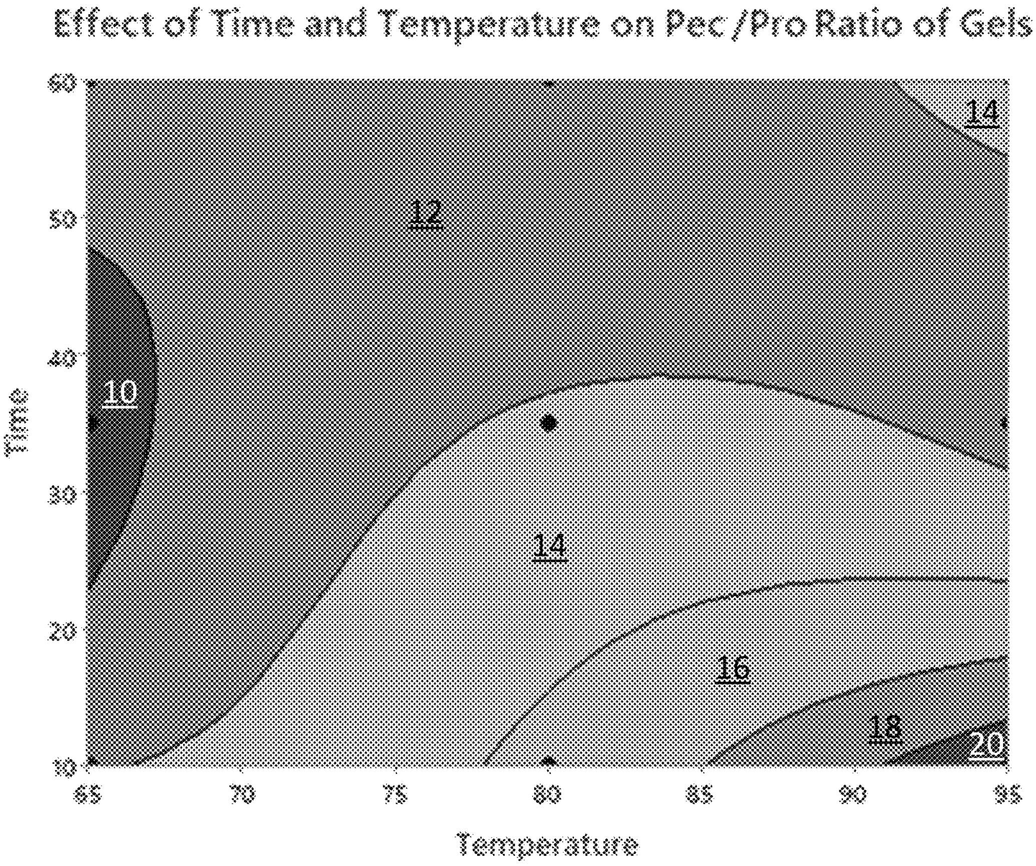
FIG. 2C is a plot depicting the combined effects of time and temperature for regression analysis based on pectin/protein ratio. 10=<0.5; 12=0.5 to 0.6; 14=0.6 to 0.7; 16=0.7 to 0.8, 18=0.8 to 0.9; 20=0.9 to 1.0.

FIG. 2A shows that time, temperature, their 2-way interaction, and pH*pH are statistically significant terms of pec/pro regression analysis. An increase in temperature and lowering the time would result in higher pectin extraction with minimal depolymerization of GalA units, as can be seen in the individual effect of these parameters (FIG. 2A) as well as their combined contribution (FIG. 2C). A decrease in pH increases the content of protein significantly because the pH is far from its Ip. This is the only condition where the protein would be in solubilized form and contribute more to the gel phase. Higher pH values favor insoluble aggregate formation. Thus at higher pH's, a considerable portion of protein would stay with the insoluble solid phase upon centrifugation. Also, extremely acidic conditions would result in degradation of the pectin. In short, very low pH's would decrease the final pec/pro ratio, as reflected as the AA term in FIG. 2A. The pH effect on this response is contradictory to its impact on hydrogel yield, which can be explained by better gelation of debranched pectin due to the higher contribution of hydrogen bonding, enhanced hydrophobic interactions by exposed nonpolar protein groups under lower pH, and the compact nature of pectin hydrogels formed by the conformational transition to three-helix compared to those of electrostatically formed pectin-Ca2+hydrogels. Extended heating times would result in acid hydrolysis and depolymerization of debranched pectin, lowering the pec/pro ratio. Also, the broader range of experimentally obtained pectin contents (10-19.58%), as compared to the protein contents (18.29-22.36%) (Table 2), makes the contribution of pectin to the ratio more significant.

Although the pec/pro model shows more statistically significant terms in the model than the yield regression (FIG. 2A), the effect of model over-fit is still observable. See Tables 10-12. The regression was repeated using the backward elimination method and the $R^2$ decreased from 94.79% to 89.03%. See Tables 13-15.

TABLE 10

Response Surface Regression: Pectin/Protein Ratio

| Term | Coef | SE Coef | 95% CI | T-Value | P-Value | VIF |
|---|---|---|---|---|---|---|
| Constant | 0.5890 | 0.0185 | (0.5464, 0.6316) | 31.90 | 0.000 | |
| Blocks | | | | | | |
| 1 | 0.0024 | 0.0161 | (−0.0347, 0.0395) | 0.15 | 0.886 | 1.56 |
| 2 | 0.0171 | 0.0161 | (−0.0200, 0.0542) | 1.06 | 0.318 | 1.56 |
| 3 | −0.0195 | 0.0165 | (−0.0577, 0.0186) | −1.18 | 0.272 | * |
| pH | −0.0342 | 0.0151 | (−0.0691, 0.0006) | −2.26 | 0.053 | 1.00 |
| Time | −0.0878 | 0.0151 | (−0.1227, −0.0530) | −5.81 | 0.000 | 1.00 |
| Temperature | 0.1040 | 0.0151 | (0.0692, 0.1389) | 6.88 | 0.000 | 1.00 |
| pH*pH | 0.0960 | 0.0292 | (0.0287, 0.1633) | 3.29 | 0.011 | 1.86 |
| Time*Time | 0.0526 | 0.0292 | (−0.0147, 0.1199) | 1.80 | 0.109 | 1.86 |
| Temperature*Temperature | −0.0412 | 0.0292 | (−0.1085, 0.0261) | −1.41 | 0.195 | 1.86 |
| pH*Time | 0.0097 | 0.0169 | (−0.0293, 0.0486) | 0.57 | 0.583 | 1.00 |
| pH*Temperature | 0.0268 | 0.0169 | (−0.0121, 0.0658) | 1.59 | 0.151 | 1.00 |
| Time*Temperature | −0.0788 | 0.0169 | (−0.1178, −0.0398) | −4.66 | 0.002 | 1.00 |

TABLE 11

Model Summary

| S | R-sq | R-sq(adj) | R-sq(pred) |
|---|---|---|---|
| 0.0478034 | 94.79% | 87.62% | 8.18% |

TABLE 12

Analysis of Variance

| Source | DF | Seq SS | Adj SS | Adj MS | F-Value | P-Value |
|---|---|---|---|---|---|---|
| Model | 11 | 0.332538 | 0.332538 | 0.030231 | 13.23 | 0.001 |
| Blocks | 2 | 0.026960 | 0.003832 | 0.001916 | 0.84 | 0.467 |
| Linear | 3 | 0.197042 | 0.197042 | 0.065681 | 28.74 | 0.000 |
| pH | 1 | 0.011716 | 0.011716 | 0.011716 | 5.13 | 0.053 |
| Time | 1 | 0.077109 | 0.077109 | 0.077109 | 33.74 | 0.000 |
| Temperature | 1 | 0.108216 | 0.108216 | 0.108216 | 47.36 | 0.000 |
| Square | 3 | 0.052373 | 0.052373 | 0.017458 | 7.64 | 0.010 |
| pH*pH | 1 | 0.043301 | 0.024748 | 0.024748 | 10.83 | 0.011 |
| Time*Time | 1 | 0.004509 | 0.007432 | 0.007432 | 3.25 | 0.109 |
| Temperature*Temperature | 1 | 0.004563 | 0.004563 | 0.004563 | 2.00 | 0.195 |
| 2-Way Interaction | 3 | 0.056163 | 0.056163 | 0.018721 | 8.19 | 0.008 |
| pH*Time | 1 | 0.000748 | 0.000748 | 0.000748 | 0.33 | 0.583 |
| pH*Temperature | 1 | 0.005758 | 0.005758 | 0.005758 | 2.52 | 0.151 |
| Time*Temperature | 1 | 0.049658 | 0.049658 | 0.049658 | 21.73 | 0.002 |
| Error | 8 | 0.018281 | 0.018281 | 0.002285 | | |
| Lack-of-Fit | 5 | 0.017780 | 0.017780 | 0.003556 | 21.30 | 0.015 |
| Pure Error | 3 | 0.000501 | 0.000501 | 0.000167 | | |
| Total | 19 | 0.350819 | | | | |

TABLE 13

| Response Surface Regression: Pectin/Protein Ratio Backward Elimination of Terms α to remove = 0.05 | | | | | |
|---|---|---|---|---|---|
| Term | Coef | SE Coef | T-Value | P-Value | VIF |
| Constant | 0.5835 | 0.0166 | 35.19 | 0.000 | |
| pH | −0.0342 | 0.0166 | −2.06 | 0.058 | 1.00 |
| Time | −0.0878 | 0.0166 | −5.30 | 0.000 | 1.00 |
| Temperature | 0.1040 | 0.0166 | 6.27 | 0.000 | 1.00 |
| pH*pH | 0.1146 | 0.0235 | 4.89 | 0.000 | 1.00 |
| Time*Temperature | −0.0788 | 0.0185 | −4.25 | 0.001 | 1.00 |

TABLE 14

| Model Summary | | | |
|---|---|---|---|
| S | R-sq | R-sq(adj) | R-sq(pred) |
| 0.0524363 | 89.03% | 85.11% | 72.92% |

TABLE 15

| Analysis of Variance | | | | | |
|---|---|---|---|---|---|
| Source | DF | Adj SS | Adj MS | F-Value | P-Value |
| Model | 5 | 0.312325 | 0.062465 | 22.72 | 0.000 |
| Linear | 3 | 0.197042 | 0.065681 | 23.89 | 0.000 |
| pH | 1 | 0.011716 | 0.011716 | 4.26 | 0.058 |
| Time | 1 | 0.077109 | 0.077109 | 28.04 | 0.000 |
| Temperature | 1 | 0.108216 | 0.108216 | 39.36 | 0.000 |
| Square | 1 | 0.065626 | 0.065626 | 23.87 | 0.000 |
| pH*pH | 1 | 0.065626 | 0.065626 | 23.87 | 0.000 |
| 2-Way Interaction | 1 | 0.049658 | 0.049658 | 18.06 | 0.001 |
| Time*Temperature | 1 | 0.049658 | 0.049658 | 18.06 | 0.001 |
| Error | 14 | 0.038494 | 0.002750 | | |
| Lack-of-Fit | 11 | 0.037993 | 0.003454 | 20.69 | 0.015 |
| Pure Error | 3 | 0.000501 | 0.000167 | | |
| Total | 19 | 0.350819 | | | |

The decrease in $R^2$ before and after implying the backward elimination was smaller than that of the yield regression analysis, showing higher goodness of fit and predictability for the pec/pro ratio. This is also reflected in much lower residual values of the model for this response in FIG. 2B. Like the regression model of yield, the pec/pro ratio's normal probability plot shows no skewness or kurtosis, implying random and normal distribution of data points. The regression model with reduced factors, i.e., after backward elimination, is shown in Equation (4):

$$\text{Pec/Pro Ratio}=0.042-0.2348\text{pH}+0.01330\text{Time}+0.01429\text{Temperature}+0.02864\text{pH*pH}-0.000210\text{Time*Temperature} \quad \text{Equation 4}$$

The higher accuracy of pec/pro response is mainly because it is calculated based on the contents of these biopolymers, as determined by quantifying the GalA and nitrogen content. The calculation thus excludes (a) the role of monosaccharide composition; (b) the distribution of GalA in the backbone; (c) the acetyl/methyl contents for pectin; (d) the amino acid composition; (e) the amount of acidic and basic subunits; and (f) the extent of denaturation and surface hydrophobicity for protein. Also, this response is much less dependent on the gel properties, such as WHC and inter-polymer interactions, compared to the yield. (Adding ionic strength as an additional independent factor to the model might further improve the predictability of the pec/pro ratio.)

Due to the better goodness of fit and predictability of the pec/pro ratio compared to the yield, this response was the basis of sample selection for evaluating the rheological behavior of the hydrogels. Rheological analysis of the hydrogels with the highest (H) and lowest (L) pec/pro ratio was undertaken to gain insight into the gel strength and flow behavior of the fabricated novel hydrogels.

Rheological Analysis:

The strength and flow properties of hydrogels H (highest pec/pro ratio; 1.03; entry 9 of Table 2) and L (lowest pec/pro ratio; 0.47— entry 17 of Table 2) were tested according to procedures described hereinabove in the section titled "Rheological Characterization." The results are presented in FIGS. 3A, 3B, and 3C.

Figure 3A:
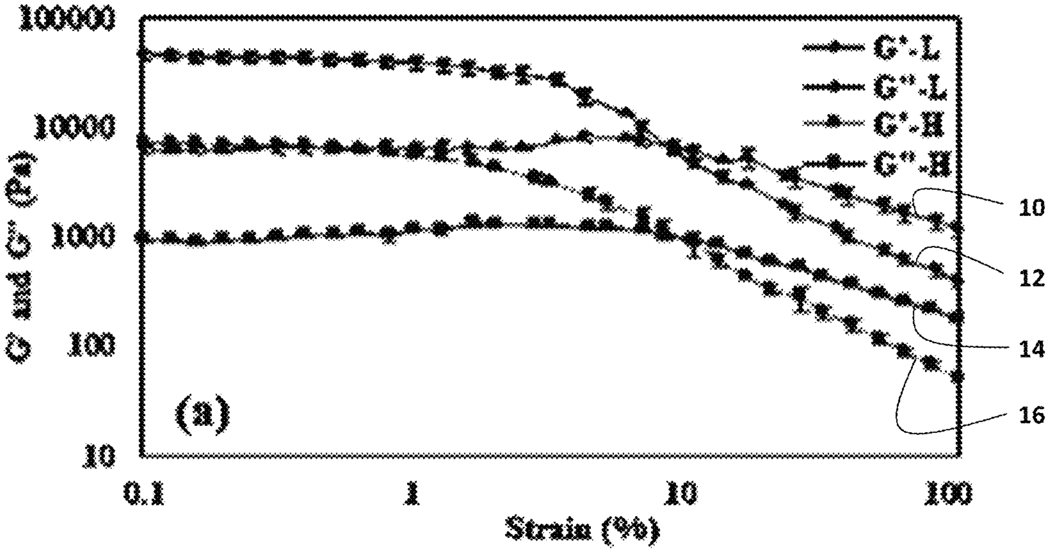
FIG. 3A is graph of strain sweep (i.e., fluid resistance to strain) for the H and L hydrogels. Key: 10=G" for L; 12=G' for L; 14=G" for H; 16=G' for H.

FIG. 3A shows the results of the large amplitude oscillatory shear (LAOS) test of hydrogels L and H. Both hydrogels show similar behaviors with prevailing elastic characteristics (G'>G") at low strains before the structural breakdown with linearity limits of less than 2% (hydrogel L: ~1.6% and hydrogel H: ~1%). The loss modulus of both hydrogels reveals a local maximum close to the crossover point, representing the weak strain overshoot behavior of hydrogels. The appearance of this peak in G" is generally attributed to the increase of the effective volume, viscous dissipation, or reformation of the clusters developed during the oscillatory shear, depending on the material properties, aggregate sizes, and polymer-solvent/polymer-polymer interactions. K. Hyun, M. Wilhelm, C. O. Klein, K. S. Cho, J. G. Nam, K. H. Ahn, S. J. Lee, R. H. Ewoldt, G. H. McKinley, A review of nonlinear oscillatory shear tests: Analysis and application of large amplitude oscillatory shear (LAOS), *Prog. Polym. Sci.* 36 (2011) 1697-1753. Hydrogel H shows a gradual and monotonous G' decrease and a single broad peak in G" over the studied strain range due to the enhanced viscous dissipation by plastic rearrangements during yielding, characteristic of soft glassy gels with creamy texture. Similar results for the LAOS moduli behavior of WPI-LMP emulsion gels without excess protein were reported by Kadiya and Ghosh (2022). K. Kadiya, S. Ghosh, Pectin degree of esterification influences rheology and digestibility of whey protein isolate-pectin stabilized bilayer oil-in-water nano-emulsions, *Food Hydrocoll.* 131 (2022) 107789. For hydrogel L, a heterogenous gel behavior was observed with higher standard deviations of moduli values (even at lower strains), sharper increase in G" before the crossover point, and non-monotonic cascade changes in G' at strains exceeding the linearity limit. Kadiya and Ghosh (2022) showed a similar trend of G' changes in the case of WPI-LMP with excess protein. Also, the local maximum of G" for hydrogel L was sharper and shifted to slightly higher strain values compared to that of hydrogel H, along with an appearance of a small second peak for loss modulus. The presence of bumps in nonlinear range for G' and observation of two distinct peaks in G" in the LAOS test are representative of a fractal colloidal gel with two-step yielding, with initial yield due to rupture, followed by shear-induced densification into a compact cluster, and finally, the breakup of the formed clusters resulting in the appearance of the second peak. It has been reported that the second peak also appears due to the increased inter-particle attractive forces and higher volume fraction occupied by the particles. Z. Shao, A. S. Negi, C. O. Osuji, Role of interparticle attraction in the yielding response of microgel suspensions, *Soft Matter.* 9 (2013) 5492-5500 and N. Koumakis, G. Petekidis, Two-step yielding in attractive colloids: transition from gels to attractive glasses, *Soft Matter.* 7 (2011) 2456-2470. All these explanations are consistent with the expectations of hydrogel L due to the involved intra- and inter-polymer interactions governed by the pH and temperature. The formation of larger protein aggregates and clusters at pH=3.8 (closest pH to soy protein's isoelectric point) and low temperature (less denatured proteins compared to higher temperatures and lower pH values, i.e., hydrogel H) is probably responsible for the higher occupied volume fraction of proteins in hydrogel L and lower pec/pro ratio. The presence of packed protein aggregates and stronger electrostatic associative interactions for hydrogel L, due to the pectin and protein carrying opposite charges at pH=3.8, are likely responsible for its higher viscosity and G', which is also reflected as higher resistance to rupture in lower strains. Additionally, this hydrogel has inferior WHC (Table 2) due to the dense structure with less space available to entrap the water molecules within the gel network, further contributing to its higher viscosity. On the contrary, the pectin-protein interactions in hydrogel H are mostly non-ionic (hydrophobic interactions and hydrogen bonding). The former likely results from more denatured protein under higher temperatures and lower pH, while the latter is likely primarily due to the carboxylic acid-amide physical bonding, both weaker than the electrostatic bonds. Also, the lower molecular weight of the pectin and protein induced by very low pH and high temperatures reduces the number of junction zones per chain, reducing the extent of crosslinking, which results in a weaker gel network formation and a lower storage modulus for hydrogel H (FIGS. 3A and 3B). The larger volume of interparticle void spaces due to the smaller debranched and depolymerized pectin molecules and denatured proteins with extended coil morphology enhances the WHC of hydrogel H, leading to its lower viscosity (FIG. 3C). Many studies have reported similar pH-dependent properties for gels prepared from globular proteins, where fine-stranded, smaller size, homogenous and transparent hydrogels are formed at pH far from the protein's Ip. In contrast, those produced at pH close to Ip are weak opaque particulate gels with inferior WHC. See, for example, S. Ikeda, V. J. Morris, Fine-stranded and particulate aggregates of heat-denatured whey proteins visualized by atomic force microscopy, *Biomacromolecules.* 3 (2002) 382-389.

Figure 3B:
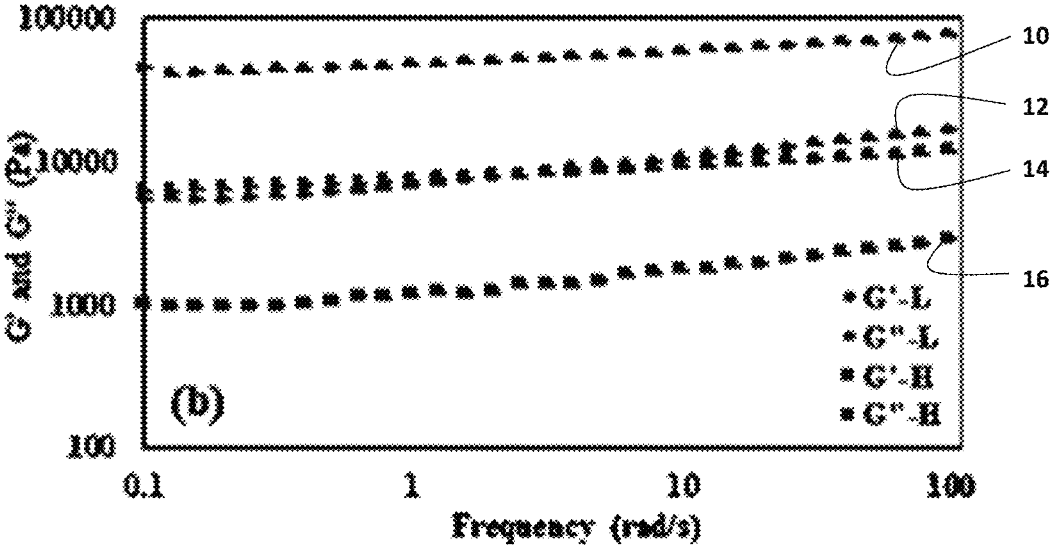
FIG. 3B is a graph of the frequency sweep for the H and L hydrogels. Key: Key: 10=G' for L; 12=G" for L; 14=G' for H; 16=G" for H.

FIG. 3B shows that the storage modulus is higher than the loss modulus in the LVE regime over the probed frequency range, confirming the dominant elastic behavior over the viscous one. However, the moduli values for both hydrogels are not frequency independent. The slight increase in the storage and loss moduli with increasing frequency is a characteristic of weak gels usually observed in physical gels (higher the slope, weaker the polymer network) rather than the constant moduli of strong gels formed by chemical crosslinking. Such a behavior can be attributed to the absence of covalent chemical bonding or a crosslinker in the SBH-based hydrogel formation, which is mainly held together through electrostatic attractions, hydrophobic interactions, and hydrogen bonding.

Figure 3C:
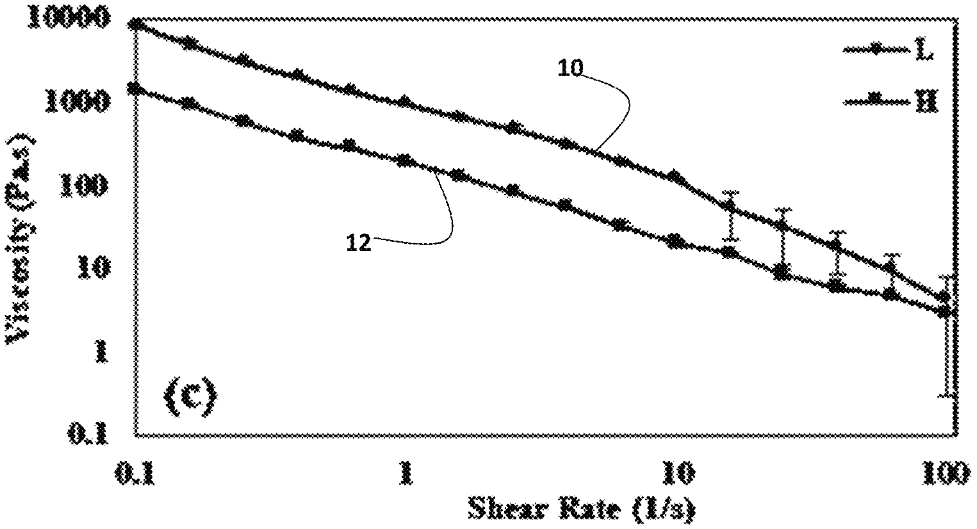
FIG. 3C is a graph of steady flow (viscosity v. shear rate) for the H and L hydrogels. Key: 10=L; 12=H. (G' is the shear storage modulus. G" is the loss modulus.)

The flow behavior of the hydrogels was evaluated by applying steady shear of 0.1-100 1/s (FIG. 3C). The results show pseudoplastic shear-thinning flow for both H and L hydrogels, with significantly higher initial viscosity for the latter, consistent with the corresponding moduli values (FIGS. 3A and 3B). The absence of the plateau region in the steady state shearing confirms that the polymer networks are relatively weak. Similar to the strain-induced deformation (FIG. 3A), hydrogel H shows a linear decrease in the viscosity over the studied shear range with no significant deviation from the line, i.e., bumping or abrupt changes. In contrast, hydrogel L shows a more heterogenous shear thinning trend with a local shear-thickening at shear rates of 1-10 1/s. Such a behavior can be due to the jamming and interparticle friction of the large protein aggregates. This discontinuous shear thickening phenomenon has been reported for highly concentrated colloidal dispersions, suspensions, and gels. D. Vlassopoulos, M. Cloitre, Tunable rheology of dense soft deformable colloids, *Curr. Opin. Colloid Interface Sci.* 19 (2014) 561-574. Up to the shear rates of 101/s, the standard deviation of duplicate viscosity values of hydrogel L are very low, similar to the ones observed for hydrogel H. However, at shear rates exceeding this value, the changes in viscosity are more abrupt, representing more shear-thinning properties. Also, much higher standard deviations were observed at these shear rates, reflecting the heterogeneous nature of hydrogel L, causing more significant errors in the experimental evaluation of its shear-induced flow behavior. Dorishetty et al. (2019) showed that as the SPI concentration increases, the viscosity of SPI gel increases significantly, and its shear thinning behavior becomes more pronounced than those of the dilute ones, which is consistent with the changes in viscosity and shear thinning behavior of SBH hydrogels as the concentration of protein increases (hydrogel H to hydrogel L). P. Dorishetty, R. Balu, A. Sreekumar, L. de Campo, J. P. Mata, N. R. Choudhury, N. K. Dutta, Robust and tunable hybrid hydrogels from photo-cross-linked soy protein isolate and regenerated silk fibroin, ACS Sustain. Chem. Eng. 7 (2019) 9257-9271. The heterogeneity and brittleness of hydrogel L could be due to the thermodynamic incompatibility between pectin and protein and the resultant phase separation when the concentration of the latter is higher than the former, as reported for the copolymer gels of pea protein-LMP (D. Zhang, D. Chen, B. Patel, O. H. Campanella, Pectin as a natural agent for reinforcement of pea protein gel, *Carbohydr. Polym.* 298 (2022) 120038.) and WPI-LMP (Kadiya & Ghosh, 2022, supra).

As disclosed herein, novel pectin-protein hydrogels were produced from SBH through hydrothermal acidic gelation of pectin and protein without requiring individual biopolymer isolation and purification. The separated insoluble solid and liquid phases are rich in cellulose and dissolved non-gelling fraction of polymers, which can be used to produce cellulose specialties and films/coatings, respectively. The effect of pH, time, and temperature on gel yield and pec/pro ratio was studied using CCD and RSM. The regression analysis showed that all factors were statistically significant in both responses. No significant contribution of the interaction of these factors was observed on the yield, while time*temperature was the only crucial 2-way interaction term affecting the pec/pro ratio.

Higher temperatures and lower pH positively affected the extraction and gelation of pectin and protein. While increasing the heating time facilitated depolymerization and subsequent reduction in the yield. Increasing temperature and pH positively influenced the pec/pro ratio with increased pectin extraction and less degradation of the GalA in the backbone. The lower pH (far from the protein's Ip) is a prerequisite for protein solubility and increasing its contribution to the gel phase. In comparison, protein would form heat-induced insoluble aggregates at higher pH (close to the Ip), which will mostly stay with the insoluble solid fraction after centrifugation.

The results of regression modeling revealed that the pec/pro ratio was more predictable with higher goodness of fit (based on the $R^2$ and residual values) because it is mainly affected by the studied factors rather than being dependent on the intrinsic structure, conformational, and morphological polymer properties and the dynamic interpolymer interactions, which is the case for hydrogel yield. Since the RSM more accurately predicted the pec/pro ratio, the hydrogels with the highest and lowest pec/pro ratio (H and L) were selected to evaluate hydrogel properties through rheological tests.

Both hydrogels can be classified as physical gels with relatively low mechanical strength (yield strains of approximately 1.6% and 1.0% for L and H), frequency-dependent storage and loss moduli, and shear thinning behavior. Hydrogel L had a higher protein concentration, mostly in the clustered large aggregates form resulting in a stiff opaque particulate gel with inferior WHC. The pectin-protein interaction was mostly of ionic type between the oppositely charged biopolymers at pH=3.8. Therefore, hydrogel L showed higher strength, viscosity, and yield strain. However, the thermodynamic incompatibility between pectin and protein introduced a high level of heterogeneity and brittleness to the gel structure, reflected in two-step yielding and cascade changes in its moduli as well as the appearance of lower and higher shear thinning regions at low and high shear rates. Hydrogel H, conversely, had a creamy texture, with fine-stranded homogenous structure and higher WHC due to the smaller particle sizes of both biopolymers and the more available interparticle void space for water entrapment. Therefore, its shear- and strain-induced flow behaviors were more monotonous. However, due to biopolymers' lower molecular weight and non-ionic interactions, hydrogel H had lower viscosity and strength.

The results show tunable functional properties can be achieved for the novel hydrogels with applications in the food and cosmetics industry due to the similarity of the rheological behavior to the food and emulsion gels.

The invention claimed is:

1. A method of making a hydrogel, the method comprising:

(a) treating a cellulosic biomass comprising pectin and protein with an aqueous acidic solution at a pH, at a temperature, and for a time sufficient to cause formation of at least a gel fraction comprising the hydrogel.

2. The method of claim 1, further comprising, after step (a):

(b) blending the treated cellulosic biomass of step (a), to yield a mixture; and then (c) centrifuging the mixture of step (b) to concentrate the gel fraction.

3. The method of claim 1, further comprising, after step (b) and before step (c):

(b)(i) cooling the mixture of step (b) to about 10° C. to about 0° C. to yield a cooled mixture.

4. The method of claim 1, wherein in step (a) the aqueous acidic solution has a pH ranging from about 1 to about 6.

5. The method of claim 4, wherein in step (a) the aqueous acidic solution has a pH ranging from about 1.8 to about 5.8.

6. The method of claim 4, wherein in step (a) the aqueous acidic solution has a pH ranging from about 1.8 to about 3.8.

7. The method of claim 4, wherein in step (a) the aqueous acidic solution has a pH ranging from about 3.8 to about 5.8.

8. The method of claim 4, wherein in step (a) the temperature is from about 30° C. to about 150° C.

9. The method of claim 4, wherein in step (a) the time is from about 1 minute to about 180 minutes.

10. The method of claim 1, wherein the cellulosic biomass comprises soybean hull.

11. The method of claim 1, wherein the hydrogel has a pectin-to-protein ratio of from about 0.1 to about 3.0.

12. The method of claim 1, wherein the cellulosic biomass is treated with the aqueous acidic solution at a liquid-to-solid ratio by mass of from about 1-to-1 to about 50-to-1.

13. A method of making a hydrogel, the method comprising:

(a) treating a cellulosic biomass comprising pectin and protein with an aqueous acidic solution at a pH, at a temperature, and for a time sufficient to cause formation of at least a gel fraction comprising the hydrogel;

(b) blending the treated cellulosic biomass of step (a), to yield a mixture;

(c) cooling the mixture of step (b) to about 10° C. to about 0° C. to yield a cooled mixture; and (d) centrifuging the cooled mixture of step (c) to concentrate the gel fraction.

14. The method of claim 13, wherein in step (a) the aqueous acidic solution has a pH ranging from about 1 to about 6.

15. The method of claim 13, wherein in step (a) the aqueous acidic solution has a pH ranging from about 1.8 to about 5.8.

16. The method of claim 13, wherein in step (a) the aqueous acidic solution has a pH ranging from about 1.8 to about 3.8.

17. The method of claim 13, wherein in step (a) the aqueous acidic solution has a pH ranging from about 3.8 to about 5.8.

18. The method of claim 13, wherein in step (a) the temperature is from about 30° C. to about 150° C.

19. The method of claim 13, wherein in step (a) the time is from about 1 minute to about 180 minutes.

20. The method of claim 13, wherein the cellulosic biomass comprises soybean hull.

21. The method of claim 13, wherein the hydrogel has a pectin-to-protein ratio of from about 0.1 to about 3.0.

22. The method of claim 13, wherein in step (a) the cellulosic biomass is treated with the aqueous acidic solution at a liquid-to-solid ratio by mass of from about 1-to-1 to about 50-to-1.

* * * * *